US010897588B2

(12) United States Patent
Mahara et al.

(10) Patent No.: US 10,897,588 B2
(45) Date of Patent: Jan. 19, 2021

(54) ELECTRONIC APPARATUS AND ELECTRONIC APPARATUS CONTROLLING METHOD

(71) Applicant: SONY SEMICONDUCTOR SOLUTIONS CORPORATION, Kanagawa (JP)

(72) Inventors: Kumiko Mahara, Kanagawa (JP); Yusuke Moriyama, Kanagawa (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 0 days.

(21) Appl. No.: 16/491,299

(22) PCT Filed: Feb. 14, 2018

(86) PCT No.: PCT/JP2018/005006
§ 371 (c)(1),
(2) Date: Sep. 5, 2019

(87) PCT Pub. No.: WO2018/186019
PCT Pub. Date: Oct. 11, 2018

(65) Prior Publication Data
US 2020/0029032 A1 Jan. 23, 2020

(30) Foreign Application Priority Data
Apr. 5, 2017 (JP) .................................. 2017-074928

(51) Int. Cl.
H04N 5/357 (2011.01)
G01S 17/931 (2020.01)
(Continued)

(52) U.S. Cl.
CPC ............... *H04N 5/357* (2013.01); *G01C 3/06* (2013.01); *G01S 17/32* (2013.01); *G01S 17/89* (2013.01);
(Continued)

(58) Field of Classification Search
CPC .... H04N 5/357; H04N 5/37455; H04N 5/353; H04N 5/232; G01S 17/89; G01S 17/32; G01S 17/931; G01C 3/06
See application file for complete search history.

(56) References Cited

U.S. PATENT DOCUMENTS

2014/0358418 A1 12/2014 Nakajima et al.
2015/0334372 A1* 11/2015 Kim ...................... G01S 17/894
348/46

(Continued)

FOREIGN PATENT DOCUMENTS

EP 2808700 A1 12/2014
JP 2000-201298 A 7/2000
(Continued)

OTHER PUBLICATIONS

International Search Report and Written Opinion of PCT Application No. PCT/JP2018/005006, dated Apr. 17, 2018, 09 pages of ISRWO.

Primary Examiner — Mekonnen D Dagnew
(74) Attorney, Agent, or Firm — Chip Law Group

(57) ABSTRACT

Noise is suppressed in an electronic apparatus including a light emission section and a solid state imaging element. The electronic apparatus includes an imaging section, a prohibition period setting section, and a light emission section. In the electronic apparatus, the imaging section captures image data. The light emission section emits irradiation light. The prohibition period setting section sets, as a prohibition period, a period during which noise is generated in the imaging section due to start or stoppage of light emission of
(Continued)

the irradiation light. A light emission control section controls the light emission section so as to prohibit start and stoppage of the light emission during the prohibition period.

10 Claims, 22 Drawing Sheets

(51) Int. Cl.
*G01C 3/06* (2006.01)
*G01S 17/32* (2020.01)
*G01S 17/89* (2020.01)
*H04N 5/3745* (2011.01)

(52) U.S. Cl.
CPC ....... *G01S 17/931* (2020.01); *H04N 5/37455* (2013.01)

(56) References Cited

U.S. PATENT DOCUMENTS

2016/0323488 A1* 11/2016 Aikawa .................. G03B 15/06
2017/0162490 A1    6/2017 Katsumura et al.

FOREIGN PATENT DOCUMENTS

| JP | 2000-278594 | A | 10/2000 |
| JP | 2003-333404 | A | 11/2003 |
| JP | 2011-022089 | A | 2/2011 |
| JP | 2015-007623 | A | 1/2015 |
| WO | 2016/031206 | A1 | 3/2016 |

\* cited by examiner

FIG. 7

| CONTROL SIGNAL PLS | PROHIBITION SIGNAL NG | OPERATION OF LIGHT-EMISSION ENABLE SIGNAL GENERATION SECTION |
|---|---|---|
| DISABLED | DISABLED | STOP LIGHT-EMISSION ENABLE SIGNAL EN (STOP EMISSION OF PULSE LIGHT) |
| DISABLED | ENABLED | STOP LIGHT-EMISSION ENABLE SIGNAL EN (STOP EMISSION OF PULSE LIGHT) |
| ENABLED | DISABLED | GENERATE LIGHT-EMISSION ENABLE SIGNAL EN (EMIT PULSE LIGHT) |
| ENABLED | ENABLED | STOP LIGHT-EMISSION ENABLE SIGNAL EN (STOP EMISSION OF PULSE LIGHT) |

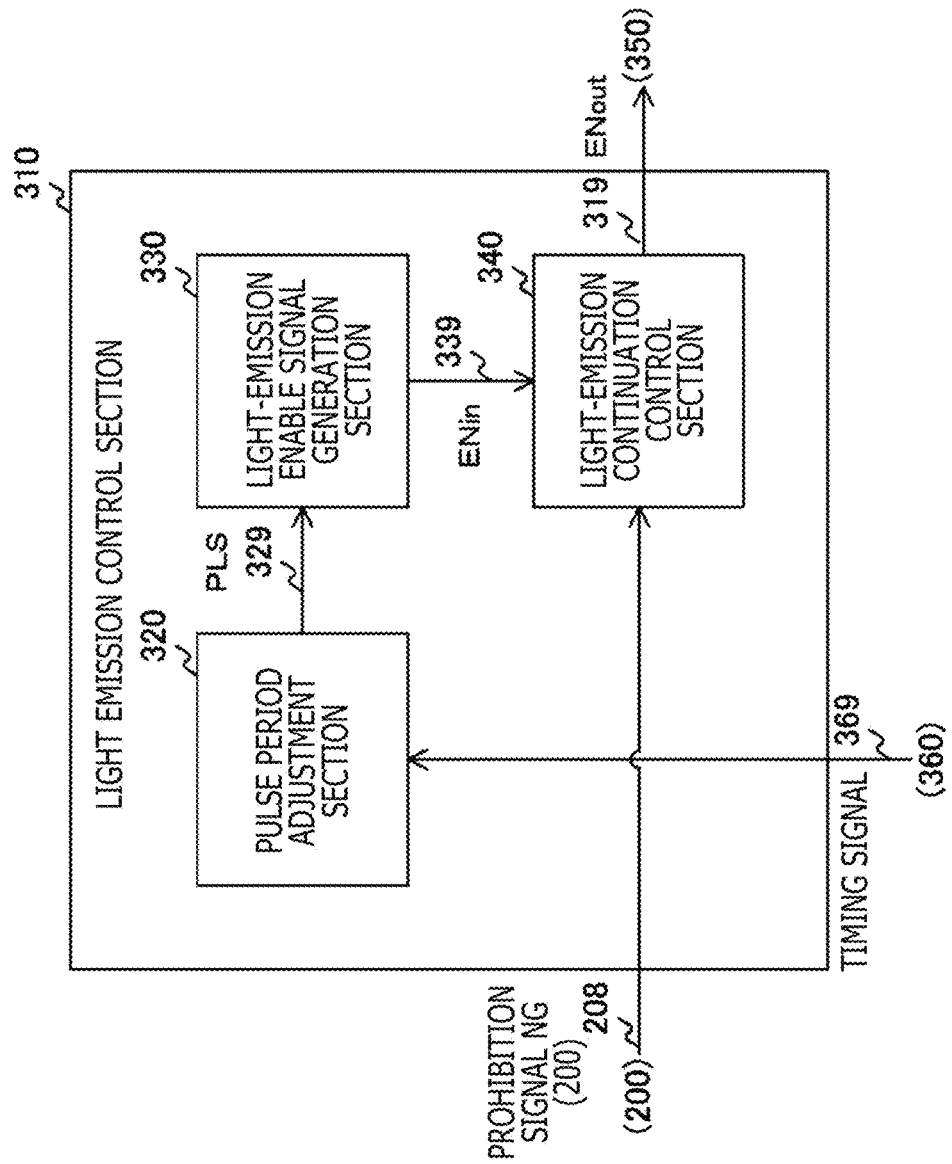

FIG. 16

| LIGHT-EMISSION ENABLE SIGNAL ENin | PROHIBITION SIGNAL NG | OPERATION OF LIGHT-EMISSION CONTINUATION CONTROL SECTION |
|---|---|---|
| DURING GENERATION | ENABLED | SET INTERNAL FLAG TO ON, AND OUTPUT LIGHT-EMISSION ENABLE SIGNAL ENin AS ENout (EMIT PULSE LIGHT) |
| DURING STOPPAGE | ENABLED | WHEN INTERNAL FLAG IS ON, GENERATE LIGHT-EMISSION ENABLE SIGNAL ENout (EMIT PULSE LIGHT) |
| DURING GENERATION | DISABLED | SET INTERNAL FLAG TO OFF, AND OUTPUT LIGHT-EMISSION ENABLE SIGNAL ENin AS ENout (EMIT PULSE LIGHT) |
| DURING STOPPAGE | DISABLED | STOP LIGHT-EMISSION ENABLE SIGNAL ENout (STOP EMISSION OF PULSE LIGHT) |

ELECTRONIC APPARATUS AND ELECTRONIC APPARATUS CONTROLLING METHOD

CROSS REFERENCE TO RELATED APPLICATIONS

This application is a U.S. National Phase of International Patent Application No. PCT/JP2018/005006 filed on Feb. 14, 2018, which claims priority benefit of Japanese Patent Application No. JP 2017-074928 filed in the Japan Patent Office on Apr. 5, 2017. Each of the above-referenced applications is hereby incorporated herein by reference in its entirety.

TECHNICAL FIELD

The present technology relates to an electronic apparatus and an electronic apparatus controlling method. More specifically, the present technology relates to an electronic apparatus including a light emission section for applying intermittent light and a solid imaging element, and to a control method for the electronic apparatus.

BACKGROUND ART

In electronic apparatuses having ranging functions, a ranging method, called ToF (Time of Flight) method, is used in many cases in related art. In such a ToF method, an object is irradiated with intermittent light of sine waves or rectangular waves from an electronic apparatus, reflection light of the irradiation light is received, and the distance is measured on the basis of the phase difference between the irradiation light and the reflection light. For example, a play device has been proposed in which a ranging sensor using the ToF method generates a depth map at a constant interval (for example, see PTL 1).

CITATION LIST

Patent Literature

[PTL 1]
Japanese Patent Laid-Open No. 2000-278594

SUMMARY

Technical Problem

In the aforementioned technology in related art, motion of a subject, etc. can be detected on the basis of the difference between the current depth map and a past depth map. However, when image recognition and the like are carried out in addition to ranging, capturing of image data is also needed. If a solid state imaging element is further added to the electronic apparatus in order to capture the image data, voltage, current, or a magnetic field fluctuates when a light emission section in the ranging sensor starts or stops light emission. Due to the fluctuation of voltage or the like, noise may be generated in the solid state imaging element. If a power source for the solid state imaging element and a power source for the ranging sensor are separated from each other, or if a high resistance is inserted in a power source system, noise caused by the fluctuation of voltage can be reduced. However, this is not desirable because an increase of the circuit scale or an increase of the cost may be involved.

The present technology has been made in view of the above circumstances, and an object thereof is to suppress noise in an electronic apparatus including a light emission section and a solid state imaging element.

Solution to Problem

The present technology has been made in order to solve the aforementioned problems. A first aspect of the present technology is an electronic apparatus including: an imaging section that captures image data; a light emission section that emits irradiation light; a prohibition period setting section that sets, as a prohibition period, a period during which noise is generated in the imaging section due to start or stoppage of the light emission of the irradiation light; and a light emission control section that controls the light emission section so as to prohibit start and stoppage of the light emission during the prohibition period, and is a control method therefor. Accordingly, an effect that a period during which noise is generated in the imaging section due to start or stoppage of the light emission is set as the prohibition period, whereby start and stoppage of the light emission is prohibited during the prohibition period, is provided.

Also, in the first aspect, the light emission control section may perform control such that a time during which the light emission is carried out by the light emission section is clocked, and the light emission is stopped when a predetermined time has been clocked. Accordingly, an effect that the light emission is stopped when the predetermined time has been clocked, is provided.

Also, in the first aspect, in a case where a start time of the prohibition period comes during clocking, the light emission control section may halt the clocking and cause the light emission section to halt the light emission, over the prohibition period. Accordingly, an effect that the clocking and the light emission are halted during the prohibition period, is provided.

Also, in the first aspect, in a case where a start time of the prohibition period comes during clocking, the light emission section may cause the light emission section to continue the light emission over the prohibition period, and cause the light emission section to stop the light emission when an end time of the prohibition period comes. Accordingly, an effect that the light emission is continued during the prohibition period, is provided.

Also, in the first aspect, the light emission control section may cause the light emission section to carry out the light emission during clocking or over the prohibition period. Accordingly, an effect that the irradiation is emitted during the clocking or over the prohibition period, is provided.

Also, in the first aspect, the imaging section and the light emission section may be provided on the same substrate. Accordingly, an effect that image capturing and light emission are carried out by means of the imaging section and the light emission section provided on the same substrate, is provided.

Also, in the first aspect, the imaging section and the prohibition period setting section may be provided in a solid state imaging element. Accordingly, an effect that the prohibition period is set in the solid state imaging element, is provided.

Also, in the first aspect, the imaging section may be provided in a solid state imaging element, and the prohibition period setting section may be provided outside the solid state imaging element. Accordingly, an effect that the prohibition period is set outside the solid state imaging element, is provided.

Also, in the first aspect, the image data may include pixel data, the imaging section may generate the pixel data by converting an analog signal to a digital signal during a predetermined sampling period, and the prohibition period may include the sampling period. Accordingly, an effect that start and stoppage of the light emission are prohibited during the prohibition period including the sampling period, is provided.

Also, in the first aspect, a light reception section that receives reflection light of the irradiation light, and a ranging computation section that computes a distance on the basis of a phase difference between the irradiation light and the reflection light, may be further included. Accordingly, an effect that the distance is computed, is provided.

Also, in the first aspect, an image synthesis section that synthesizes predetermined data with the image data on the basis of the distance, may be further included. Accordingly, an effect that the data is synthesized with the image data, is provided.

Advantageous Effect of Invention

According to the present technology, an excellent effect that noise can be suppressed in an electronic apparatus including a light emission section and a solid state imaging element, can be provided. Note that the effects described herein are not necessary limited, and any one of those described in the present disclosure may be adopted.

BRIEF DESCRIPTION OF DRAWINGS

FIG. 7 is a diagram depicting one example of operation of a light-emission enable signal generation section according to the first embodiment of the present technology.

FIG. 15 is a block diagram illustrating one configuration example of a light emission control section according to a modification of the first embodiment of the present technology.

FIG. 16 is a diagram depicting one example of operation of a light-emission continuation control section according to the modification of the first embodiment of the present technology.

DESCRIPTION OF EMBODIMENTS

Hereinafter, embodiments for implementing the present technology (hereinafter, referred to as embodiments) will be explained. The explanations are given in the following order:

1. First Embodiment (Example in which light emission is halted during a prohibition period)
2. Second Embodiment (Example in which a ranging module sets a prohibition period, and light emission is halted during the prohibition period)
3. Application Example to Moving Body 1. First Embodiment

[Configuration Example of Electronic Apparatus]

Figure 1:
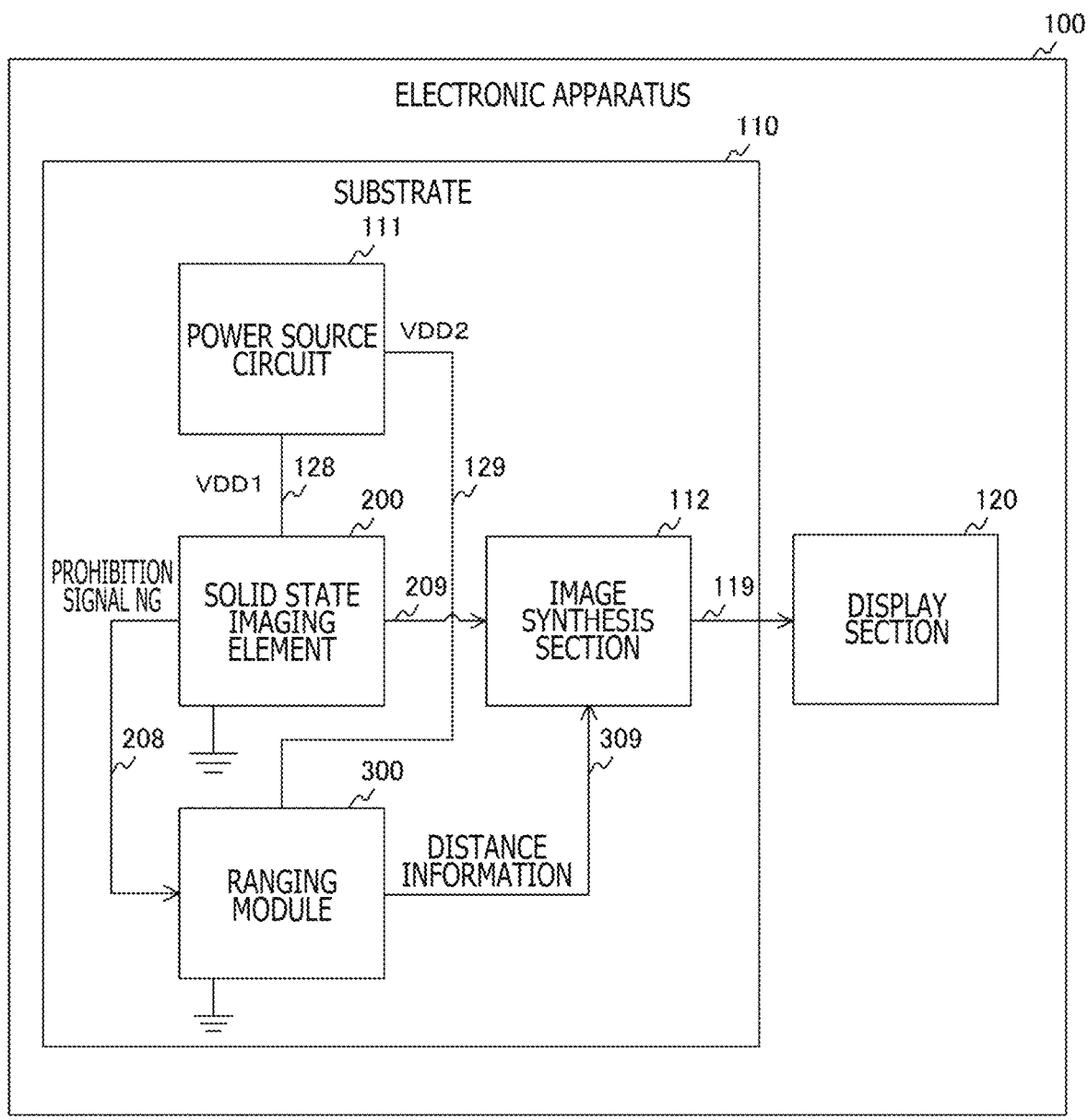
FIG. 1 is a block diagram illustrating one configuration example of an electronic apparatus according to a first embodiment of the present technology.

FIG. 1 is a block diagram illustrating one configuration example of an electronic apparatus 100 according to an embodiment of the present technology. The electronic apparatus 100 includes a substrate 110 and a display section 120. A power source circuit 111, a solid state imaging element 200, a ranging module 300, and an image synthesis section 112 are provided on the substrate 110. A smartphone or a personal computer is assumed as the electronic apparatus 100.

The power source circuit 111 is configured to supply a power source to a circuit in the substrate 110. For example, the power source circuit 111 supplies power-source voltage VDD1 to the solid state imaging element 200 via a signal line 128, and supplies power-source voltage VDD2 to the ranging module 300 via a signal line 129.

The solid state imaging element 200 captures image data during a valid image period. The solid state imaging element 200 supplies the captured image data to the image synthesis section 112 via a signal line 209. Further, the solid state imaging element 200 sets, as a prohibition period, a predetermined period within the valid image period, generates a prohibition signal NG indicating the prohibition period, and supplies the prohibition signal NG to the ranging module 300 via a signal line 208.

Here, the valid image period refers to a period during which a pixel signal is read in the cycle of a vertical synchronization signal. Moreover, the vertical synchronization signal is a cyclic signal having a predetermined frequency (e.g., 30 hertz) indicating the start timing of image capturing.

Further, the prohibition period is a period during which start or stoppage of emission of intermittent pulse light from the ranging module 300 is prohibited. As the prohibition period, a period during which a great fluctuation of voltage or current may generate noise in the solid state imaging element 200, is set. When the ranging module 300 starts or stops the light emission, the voltage, current, or magnetic field of a circuit in the module fluctuates. The fluctuation of voltage or the like is propagated to the solid state imaging element 200 via a power source system such as the power source circuit 111. When the fluctuation of voltage or the like is generated during a sampling period during which an analog signal is converted to a digital signal, for example, noise due to the fluctuation may be generated in the solid state imaging element 200. In order to suppress the noise, the solid state imaging element 200 sets, as the prohibition period, a period including the sampling period and margin periods before and after the sampling period.

The ranging module 300 is configured to measure the distance to a subject by using a ToF method. However, the ranging module 300 halts emission of pulse light during the prohibition period. When the solid state imaging element 200 and the ranging module 300 are provided on the same substrate 110, a common power source system are used therefor. Accordingly, a voltage fluctuation is easily propagated, but noise due to the voltage fluctuation can be suppressed as a result of the halt of pulse light during the prohibition period. Then, the ranging module 300 generates distance information indicating the ranged distance, and supplies the distance information to the image synthesis section 112 via a signal line 309.

The image synthesis section 112 is configured to generate synthesized image data by synthesizing predetermined data with the image data on the basis of the distance information. The image synthesis section 112 supplies the synthesized image data to the display section 120 via a signal line 119.

The display section 120 is configured to display the synthesized image data. For example, a liquid crystal panel or the like is used as the display section 120.

Note that, although the synthesized image data is displayed on the display section 120, the electronic apparatus 100 may be further provided with a recording section to record the synthesized image data. Also, the electronic apparatus 100 may be further provided with a communication section to transmit the synthesized image data to the outside.

In addition, in the electronic apparatus 100, although the solid state imaging element 200 and the ranging module 300 are provided on the same substrate 110, the solid state imaging element 200 and the ranging module 300 may be provided on different substrates. However, when the distance between the position of the solid state imaging element 200 and the position of the ranging module 300 is shorter, the discrepancy in data acquired by the solid state imaging element 200 and the ranging module 300 is less likely to be generated, and reduction of the cost and downsizing of a product are further facilitated. Therefore, the solid state imaging element 200 and the ranging module 300 are desirably provided on the same substrate.

[Configuration Example of Solid State Imaging Element]

Figure 2:
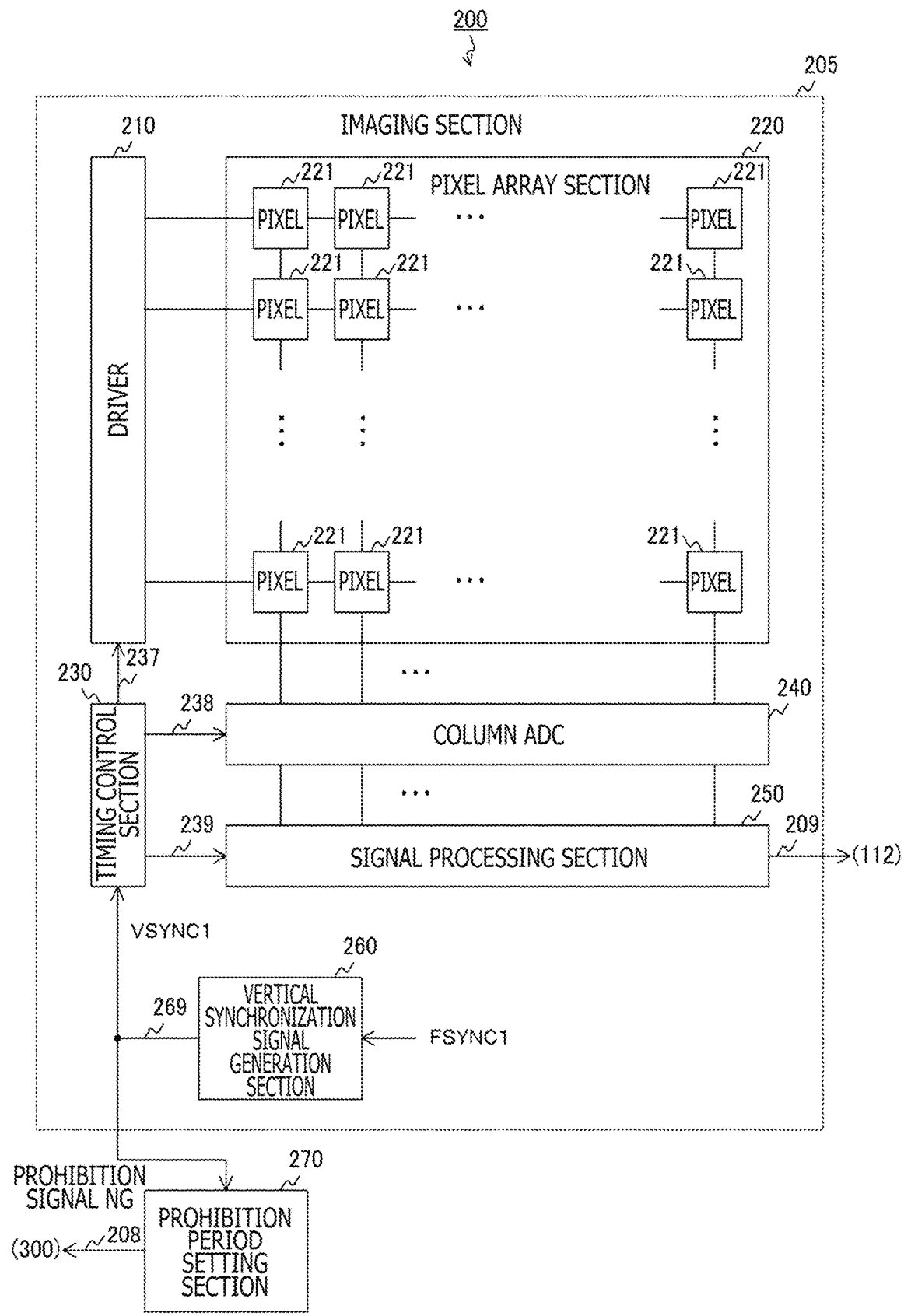
FIG. 2 is a block diagram illustrating one configuration example of a solid state imaging element according to the first embodiment of the present technology.

FIG. 2 is a block diagram illustrating one configuration example of the solid state imaging element 200 according to the first embodiment of the present technology. The solid state imaging element 200 includes an imaging section 205 and a prohibition period setting section 270.

The imaging section 205 is configured to capture image data during the valid image period. The imaging section 205 includes a driver 210, a pixel array section 220, a timing control section 230, a column ADC 240, a signal processing section 250, and a vertical synchronization signal generation section 260.

The vertical synchronization signal generation section 260 is configured to generate a vertical synchronization signal VSYNC1. The vertical synchronization signal generation section 260 generates the vertical synchronization signal VSYNC1 by multiplying a frame synchronization signal FSYNC1, for example. For example, a counter or a PLL (Phase Locked Loop) is used as the vertical synchronization signal generation section 260. Here, the frame synchronization signal FSYNC1 indicates a period during which a plurality of image data sets (frames) are captured. The vertical synchronization signal generation section 260 supplies the generated vertical synchronization signal VSYNC1 to the timing control section 230 and the prohibition period setting section 270 via a signal line 269. Note that the vertical synchronization signal generation section 260 may generate the vertical synchronization signal VSYNC1 by using an oscillation signal from a crystal oscillator.

The timing control section 230 is configured to control the driver 210, the column ADC 240, and the signal processing section 250 in synchronization with the vertical synchronization signal VSYNC1. The timing control section 230 generates a horizontal synchronization signal HSYNC1 from the vertical synchronization signal VSYNC1, and supplies the horizontal synchronization signal HSYNC1 to the driver 210 via a signal line 237. The horizontal synchronization signal HSYNC1 indicates a timing for reading a line in the image data.

The driver 210 is configured to drive the pixel array section 220 in synchronization with the horizontal synchronization signal HSYNC1. For example, a shift register is used as the driver 210.

In the pixel array section 220, a plurality of pixels 221 are arrayed in a two-dimensional lattice form. Hereinafter, a set of the pixels 221 arrayed in a predetermined direction is referred to as "row" or "line," and a set of the pixels 221 arrayed in a direction orthogonal thereto is referred to as "column."

The pixels 221 are configured to generate analog pixel signals by photoelectric conversion under control of the driver 210. The pixels 221 each output the pixel signal to the column ADC 240. A reset level or a signal level is outputted as the pixel signal. The reset level represents voltage when a floating diffusion layer in the pixel 221 is initiated. The signal level represents voltage corresponding to the exposure quantity.

The column ADC 240 is configured to perform AD (Analog to Digital) conversion on the pixel signal (signal level or reset level). The column ADC 240 includes ADCs (Analog-to-Digital Converter) for the respective columns in the pixel array section 220. The ADCs each perform conversion (in other words, sampling) of the pixel signals corresponding to the columns to digital pixel data, and supplies the digital pixel data to the signal processing section 250.

The signal processing section 250 is configured to execute a predetermined signal process on the pixel data. For example, the signal processing section 250 executes a CDS (Correlated Double Sampling) process of computing, as net pixel data, the difference between the reset level and the signal level. Then, the signal processing section 250 outputs each of the pixel data sets to the image synthesis section 112.

The prohibition period setting section 270 is configured to set, as the prohibition period, a predetermined period within the valid image period of the cycle of the vertical synchronization signal VSYNC1. The prohibition period setting section 270 generates a prohibition signal NG indicating the prohibition period, and outputs the prohibition signal NG to the ranging module 300. For example, a signal that is enabled during the prohibition period and is disabled in the other periods, is outputted as the prohibition signal NG.

Note that, although the prohibition period setting section 270 sets the prohibition period in synchronization with the vertical synchronization signal VSYNC1, this configuration is not limited. For example, the timing control section 230 may supply the horizontal synchronization signal HSYNC1 also to the prohibition period setting section 270, and the prohibition period setting section 270 may set the prohibition signal NG in synchronization with the horizontal synchronization signal HSYNC1.

[Configuration Example of Prohibition Period Setting Section]

Figure 3:
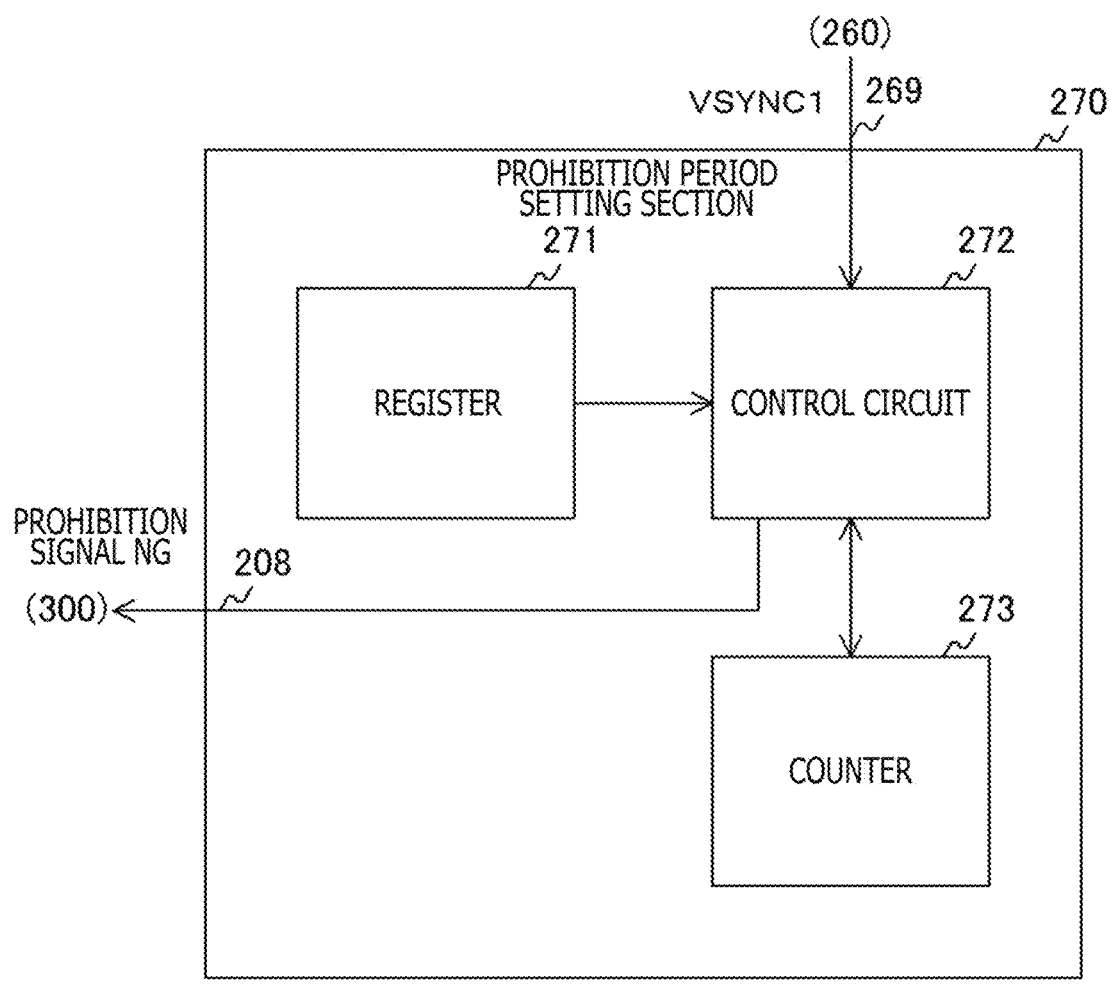
FIG. 3 is a block diagram illustrating one configuration example of a prohibition period setting section according to the first embodiment of the present technology.

FIG. 3 is a block diagram illustrating one configuration example of the prohibition period setting section 270 according to the first embodiment of the present technology. The prohibition period setting section 270 includes a register 271, a control circuit 272, and a counter 273.

The register 271 is configured to hold setting information indicating the prohibition period. For example, a counter value Ns1 indicating the start time of the prohibition period and a counter value Ne1 indicating the end time of the prohibition period are held as the setting information. The start time and the end time are expressed by relative times with respect to the rising timing of the vertical synchronization signal VSYNC1, for example. For example, in a case where the prohibition period starts at a time point when "10" milliseconds have elapsed from the rising timing and ends at a time point when "11" milliseconds have elapsed from the rising timing, the counter value Ns1 that indicates "10" milliseconds and the counter value Ne1 that indicates "11" milliseconds are held. Note that the register 271 may hold a counter value indicating the length of the prohibition period, instead of the counter value indicating the end time.

The counter 273 is configured to count a counter value (in other words, perform clocking) in synchronization with a clock signal having the frequency of which is higher than that of the horizontal synchronization signal HSYNC1.

The control circuit 272 is configured to generate the prohibition signal NG on the basis of the setting information in the register 271. For example, at the rising timing of the vertical synchronization signal VSYNC1, the control circuit 272 resets the counter 273 and starts counting (clocking). Then, by referring to the counter value, the control circuit 272 enables the prohibition signal NG over a period from Ns1 which corresponds to the start time of the prohibition period, to Net which corresponds to the end time. During the other periods, the control circuit 272 disables the prohibition signal NG.

[Configuration Example of Ranging Module]

Figure 4:
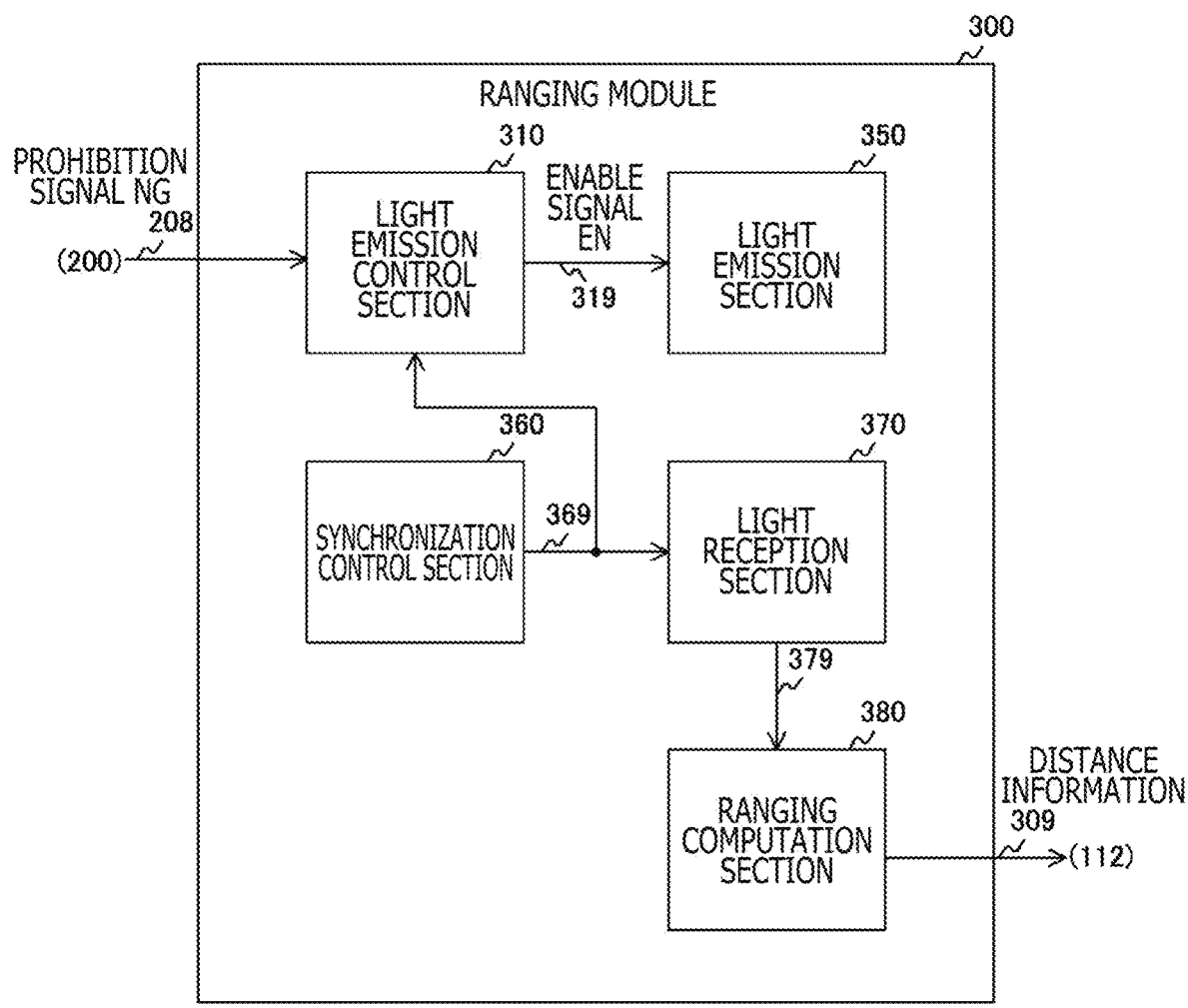
FIG. 4 is a block diagram illustrating one configuration example of a ranging module according to the first embodiment of the present technology.

FIG. 4 is a block diagram illustrating one configuration example of the ranging module 300 according to the first embodiment of the present technology. The ranging module 300 includes a light emission control section 310, a light emission section 350, a synchronization control section 360, a light reception section 370, and a ranging computation section 380.

The synchronization control section 360 is configured to cause the light emission control section 310 and the light reception section 370 to operate in synchronization. The synchronization control section 360 generates a timing signal of a predetermined frequency, and supplies the timing signal to the light emission control section 310 and the light reception section 370 via a signal line 369. The timing signal in the ranging module 300 is assumed to be non-synchronized with a synchronization signal (VSYNC1, etc.) in the solid state imaging element 200.

The light emission control section 310 is configured to control the light emission section 350 so as to prohibit start and stoppage of emission during the prohibition period. At a predetermined light emission start time, the light emission control section 310 starts generation of the light-emission enable signal EN, and also starts clocking of the light emission time. Here, the light-emission enable signal EN is a synchronization signal for giving, to the light emission section 350, an instruction as to whether or not to emit pulse light, and a value (e.g., 5 megahertz) higher than the frequency of the timing signal is set for the frequency of the light-emission enable signal EN.

Then, the light emission control section 310 supplies the light-emission enable signal EN to the light emission section 350 via a signal line 319 over a period from the light emission start time to completion of clocking of a fixed time. However, during the prohibition period indicated by the prohibition signal NG, the light emission control section 310 halts generation of the light-emission enable signal EN and clocking.

The light emission section 350 is configured to emit pules light as irradiation light under control of the light emission control section 310. For example, light (infrared light, etc.) other than visible light is generated as the pulse light.

The light reception section 370 is configured to receive reflection light of the irradiation light (pulse light) in synchronization with the timing signal. In the light reception section 370, a plurality of pixels are arrayed in a two-dimensional lattice form, for example, and pixel data is generated on the pixel basis. The light reception section 370 supplies the pixel data sets to the ranging computation section 380 via a signal line 379.

The ranging computation section 380 is configured to detect the phase difference between the irradiation light and the reflection light on the basis of the pixel data, and compute the distance from the phase difference. The ranging computation section 380 generates distance information indicating the distance on the pixel basis, and supplies a distance image (frame) including the distance information, to the image synthesis section 112 via the signal line 309.

Note that, although the light reception section 370 is configured to operate also during the prohibition period, the light reception section 370 may be configured to stop the light reception operation during the prohibition period. In this case, it is sufficient to supply the prohibition signal NG also to the light reception section 370, for example.

Moreover, although the light emission control section 310 and the light emission section 350 are provided in the ranging module 300, the light emission control section 310 and the light emission section 350 may be provided in a circuit or a module other than the ranging module 300.

[Configuration Example of Light Emission Control Section]

Figure 5:
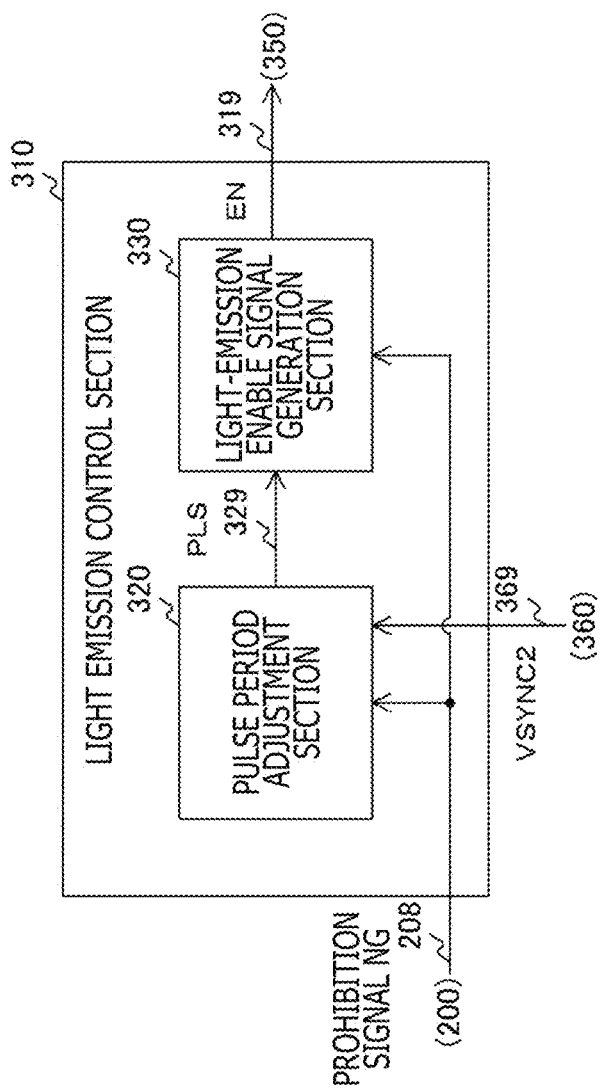
FIG. 5 is a block diagram illustrating one configuration example of a light emission control section according to the first embodiment of the present technology.

FIG. 5 is a block diagram illustrating one configuration example of the light emission control section 310 according to the first embodiment of the present technology. The light emission control section 310 includes a pulse period adjustment section 320 and a light-emission enable signal generation section 330.

The pulse period adjustment section 320 is configured to adjust the light emission period of pulse light. At a predetermined emission start time, the pulse period adjustment section 320 changes the disabled state of a control signal PLS to the enabled state, and also starts clocking. Then, when the light emission time of pulse light required for ranging of one frame has been clocked, the pulse period adjustment section 320 restores the disabled state of the control signal PLS. However, the pulse period adjustment section 320 halts clocking of the light emission time during the prohibition period indicated by the prohibition signal NG. Therefore, the period during which the control signal PLS is enabled is lengthened by the length of the prohibition period. For example, in a case where "30"-millisecond light emission is required for ranging of one frame and the prohibition period of "1" millisecond is inserted into clocking of "30" milliseconds, the clocking is halted for "1" millisecond. Thus, the control signal PLS is enabled for "31" milliseconds. The pulse period adjustment section 320 supplies the generated control signal PLS to the light-emission enable signal generation section 330 via a signal line 329.

The light-emission enable signal generation section 330 generates the light-emission enable signal EN under control of the pulse period adjustment section 320. The light-emission enable signal generation section 330 generates the light-emission enable signal EN of the predetermined frequency over a time period during which the control signal PLS is enabled, and supplies the light-emission enable signal EN to the light emission section 350. However, during the prohibition period, the light-emission enable signal generation section 330 halts generation of the light-emission enable signal EN.

[Configuration Example of Pulse Period Adjustment Section]

Figure 6:
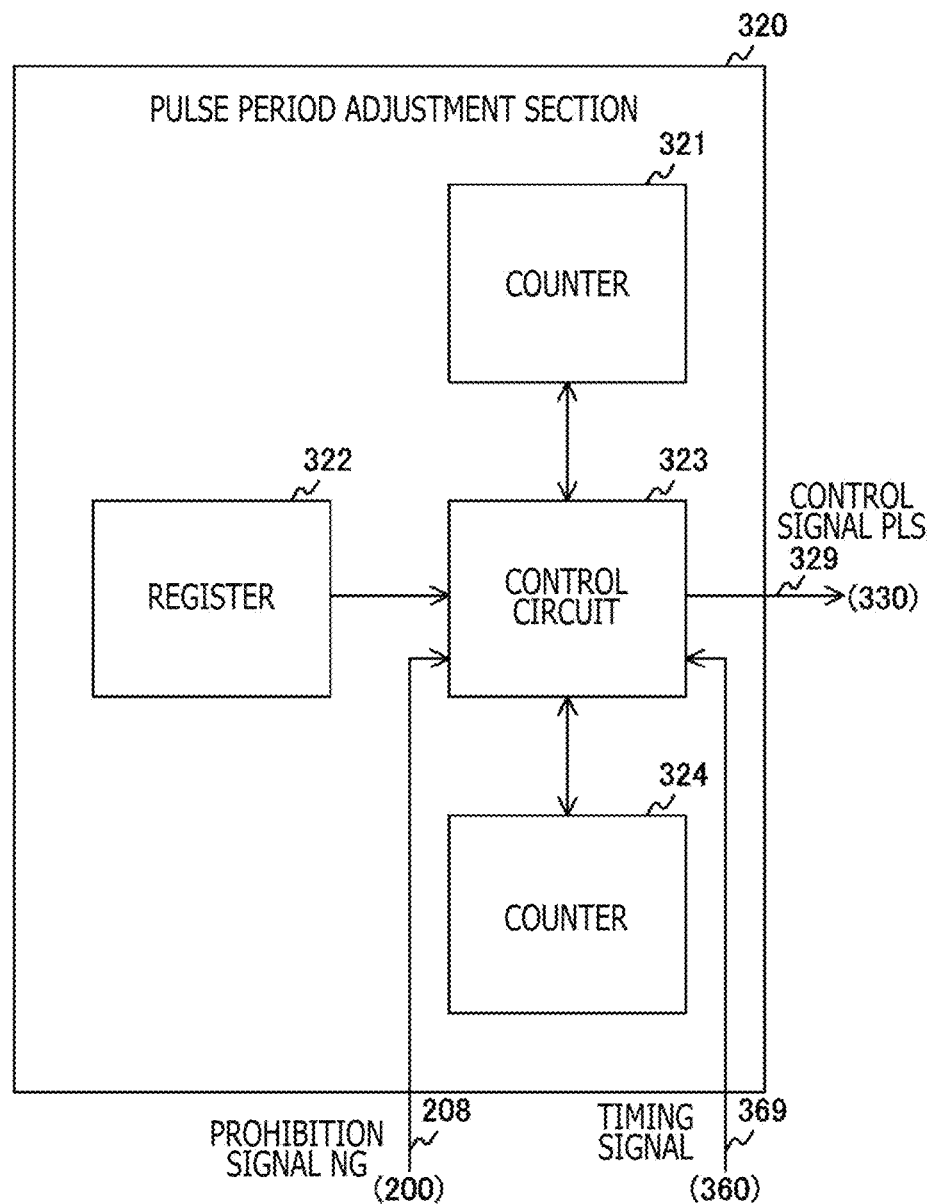
FIG. 6 is a block diagram illustrating one configuration example of a pulse period adjustment section according to the first embodiment of the present technology.

FIG. 6 is a block diagram illustrating one configuration example of the pulse period adjustment section 320 according to the first embodiment of the present technology. The pulse period adjustment section 320 includes a counter 321, a register 322, a control circuit 323, and a counter 324.

The register 322 is configured to hold setting information indicating the light emission period of pulse light. For example, a counter value Ns2 indicating the light emission start time of the light emission period and a counter value Ne2 indicating the length of the light emission period (that is, light emission time) are held in the register 322. The light emission start time is expressed by a relative time with respect to a predetermined reference timing, for example. In a case where light emission is started when "10" milliseconds have elapsed from the reference timing and the light emission is carried out over "30" milliseconds, the counter value Ns2 that indicates "10" milliseconds and the counter value Ne2 that indicates "30" milliseconds are held, for example.

The counters 321 and 324 each count (clock) a counter value in synchronization with a clock signal having the frequency of which is higher than the frequency of the horizontal synchronization signal HSYNC1. The counter 321 is used for clocking of the current time. On the other hand, the counter 324 is used for clocking of the light emission time of pules light.

The control circuit 323 is configured to generate the control signal PLS on the basis of the setting information in the register 322. For example, at the reference timing, the control circuit 323 resets the counter 321 and starts counting (clocking). Then, by referring to the counter value of the counter 321, the control circuit 323 resets the counter 324, starts clocking of the light emission time, and also changes the disabled state of the control signal PLS to the enabled state when Ns2 corresponding to the light emission start time comes.

Then, by referring to the counter value of the counter 324, the control circuit 323 disables the control signal PLS when the counter value Ne2 corresponding to the light emission time is reached. However, in a case where the prohibition signal NG is enabled during clocking by the counter 324, the control circuit 323 causes the counter 324 to halt clocking until the prohibition signal NG is disabled.

FIG. 7 is a diagram depicting one example of operation of the light-emission enable signal generation section 330 according to the first embodiment of the present technology. In a case where the control signal PLS is enabled while the prohibition signal NG is disabled, the light-emission enable signal generation section 330 cyclically generates the light-emission enable signal EN. The light emission section 350 emits pulse light in accordance with the light-emission enable signal EN.

On the other hand, in a case where the control signal PLS is disabled or in a case where the prohibition signal NG is enabled, the light-emission enable signal generation section 330 stops the light-emission enable signal EN. As a result, the light emission section 350 stops emission of pulse light.

Figure 8:
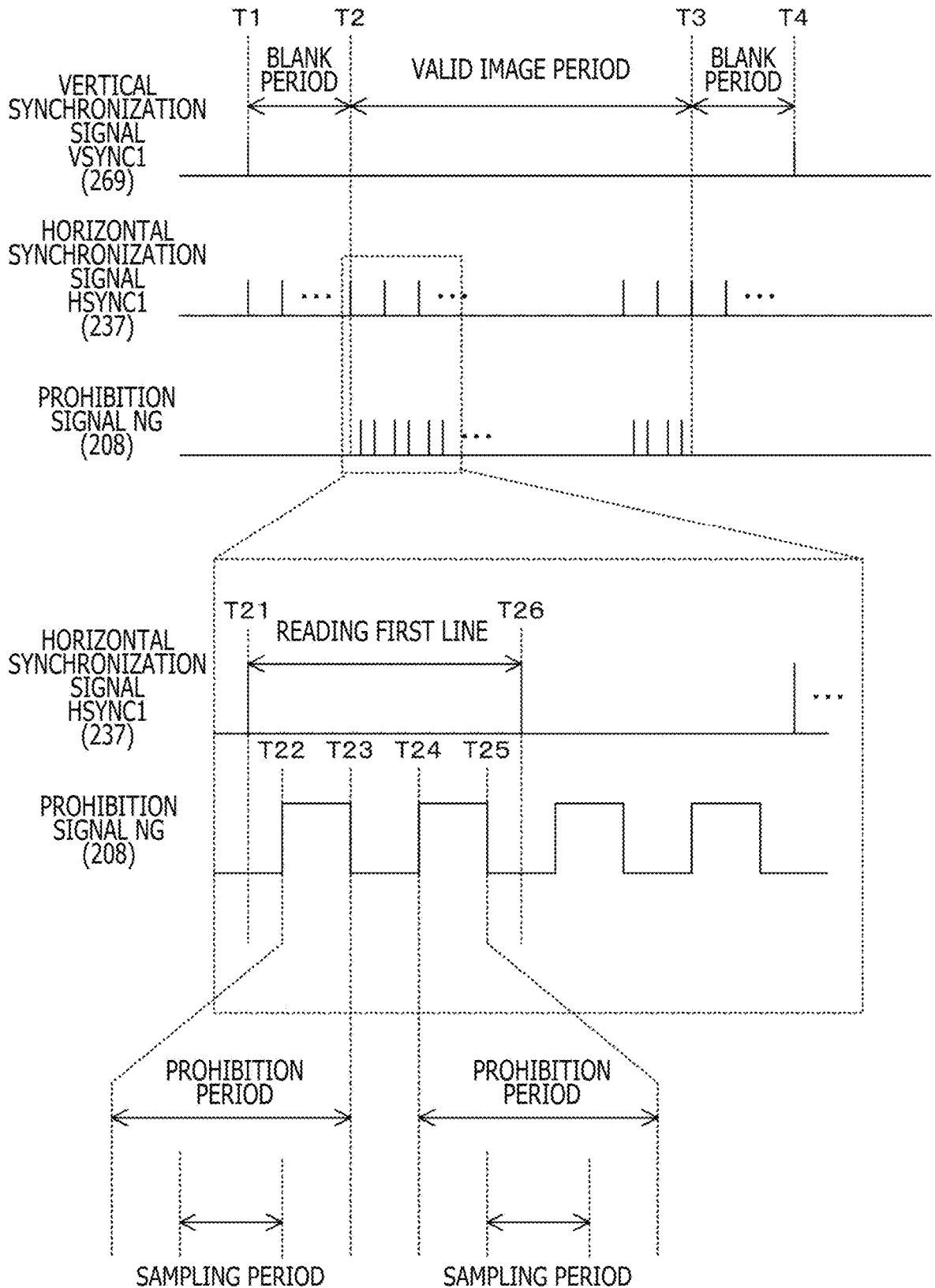
FIG. 8 is a timing chart depicting one example of operation of the solid state imaging element according to the first embodiment of the present technology.

FIG. 8 is a timing chart depicting one operation of the solid state imaging element 200 according to the first embodiment of the present technology. For example, it is assumed that the vertical synchronization signal VSYNC1 rises at timing T1 and the period from timing T1 to timing T2 corresponds to a blank period. It is also assumed that the period from timing T2 to timing T3 is the valid image period, and the period from timing T3 to timing T4 is a blank period. During the blank periods, the prohibition signal NG is set to be disabled.

Further, it is assumed that the horizontal synchronization signal HSYNC1 rises at timing T21 in the valid image period, and that reading of pixel signals of one line is completed by timing T26. In this case, the prohibition period setting section 270 sets, as the prohibition periods, the period from timing T22 to T23 including the sampling period of the reset level and the period from timing T24 to T25 including the sampling period of the signal level, for example.

Note that, although the periods each including the sampling period are set as the prohibition periods, the prohibition period can be set so as to include a period other than the sampling period as long as noise may be generated in the solid state imaging element 200 due to a fluctuation of voltage, etc., during the period. For example, a period during which the solid state imaging element 200 writes image data in a buffer memory in the solid state imaging element 200 or a period during which a floating diffusion layer in the pixels 221 converts electric charge to voltage, are assumed as the prohibition period. In addition, although the prohibition period setting section 270 sets two prohibition periods in the cycle of the horizontal synchronization signal HSYNC1, one prohibition period or three or more prohibition periods may be set.

Figure 9:
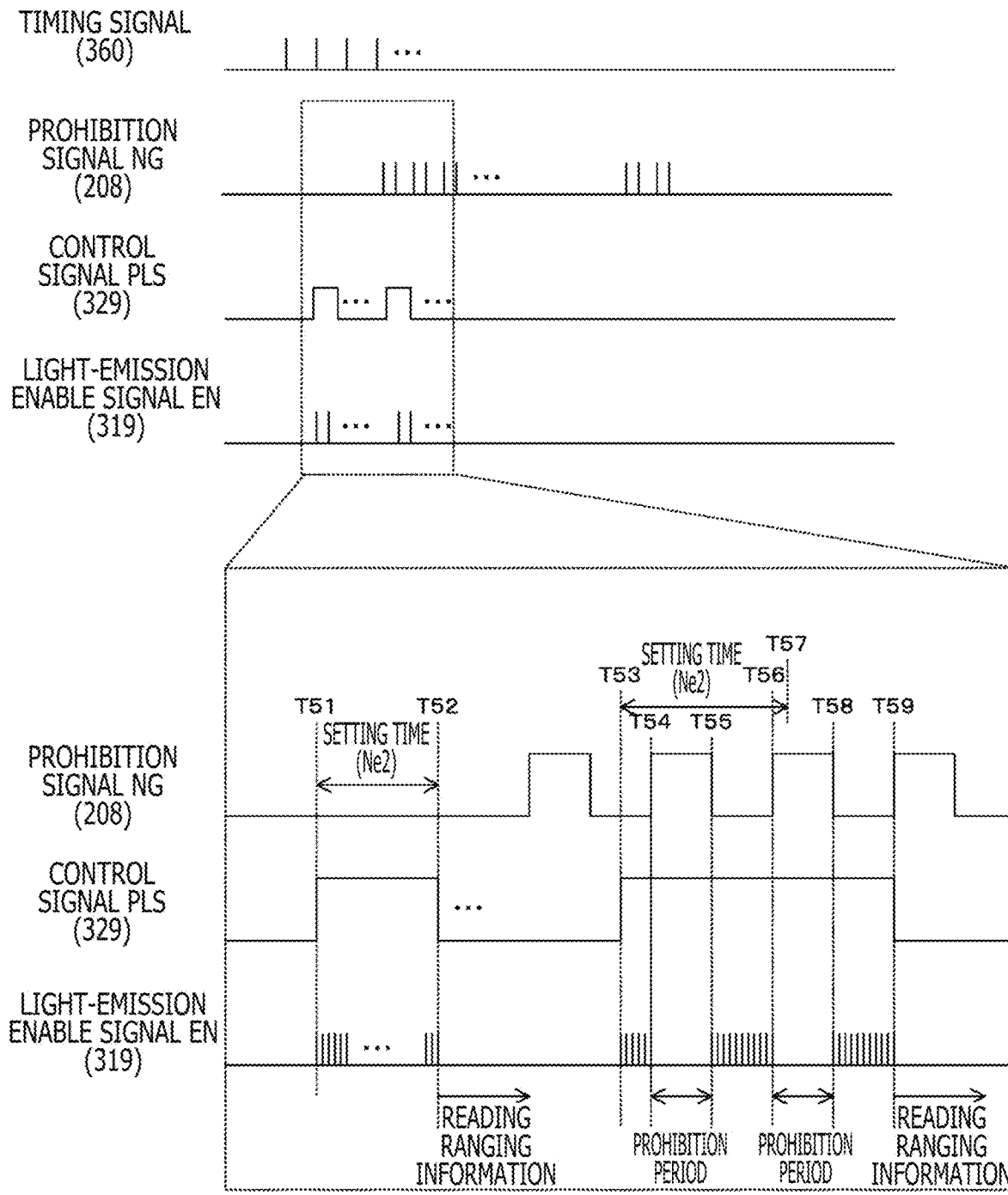
FIG. 9 is a timing chart depicting one example of operation of the ranging module according to the first embodiment of the present technology.

FIG. 9 is a timing chart depicting one example of operation of the ranging module 300 according to the first embodiment of the present technology. For example, the counter values Ns2 corresponding to timings T51 and T53 are set, in the register 322, as information indicating the light emission start times. In addition, the counter values Ne2 corresponding to the light emission times starting from the light emission start times are also set in the register 322.

At timing T51, the pulse period adjustment section 320 starts clocking of the light emission time, and also enables the control signal PLS. Then, at timing T52 when the counter value reaches Ne2, the pulse period adjustment section 320 disables the control signal PLS. During the period from timing T51 to T52, clocking is not halted because the prohibition signal NG is disabled. Regarding the prohibition signal NG and the control signal PLS in FIG. 9, the enabled state is expressed by a high level while the disabled state is expressed by a low level. Note that the low level may express the enabled state of each of these signals, conversely.

Over the period from timing T51 to T52 during which the control signal PLS is enabled, the light-emission enable signal generation section 330 generates the light-emission enable signal EN to emit pulse light. After timing T52, ranging information for one frame is read.

Further, at timing T53, the pulse period adjustment section 320 starts clocking of the light emission time, and also enables the control signal PLS. The prohibition signal NG is set to the enabled state over the period from timing T54 to T55 and over the period from timing T56 to T58. Thus, the pulse period adjustment section 320 halts clocking over these prohibition periods. Without the prohibition periods, the counter value should have reached Ne2 at timing T57 and the clocking should have been ended, but the end timing of clocking is postponed to a later timing T59 because clocking is halted. The pulse period adjustment section 320 disables the control signal PLS at timing T59.

During the period from T53 to T59 when the control signal PLS is enabled, the light-emission enable signal generation section 330 generates the light-emission enable signal EN to emit pulse light. However, during the prohibition period from timing T54 to T55 and the prohibition period from timing T56 to T58, the light-emission enable signal generation section 330 stops the light-emission enable signal EN to halt emission of pulse light. Then, after timing T59, ranging information for one frame is read.

Here, if pulse light is emitted by the ranging module 300 with no prohibition period being set, emission of pulse light is stopped at timing T57 immediately before the sampling period, for example. As a result, the voltage or current in the ranging module 300 fluctuates. The fluctuation of voltage, etc., may generate noise in the solid state imaging element 200. In particular, in a case where the solid state imaging element 200 and the ranging module 300 are provided on the same substrate 110, noise is likely to be generated.

On the other hand, the solid state imaging element 200 sets, as the prohibition period, a period including timing T57, and the ranging module 300 continuously stops the light emission over the prohibition period. Accordingly, the light emission is not started or ended in the prohibition period so that a fluctuation of the voltage or current is suppressed during the prohibition period. As a result, noise due to a fluctuation of voltage, etc., can be reduced, and the image quality of the image data can be enhanced. Since noise can be suppressed, the solid state imaging element 200 and the ranging module 300 can be provided on the same substrate 110. Moreover, any noise measures such as separation of a power source or addition of a resistance, for suppressing fluctuations of the voltage, etc., is not required.

Figure 10:
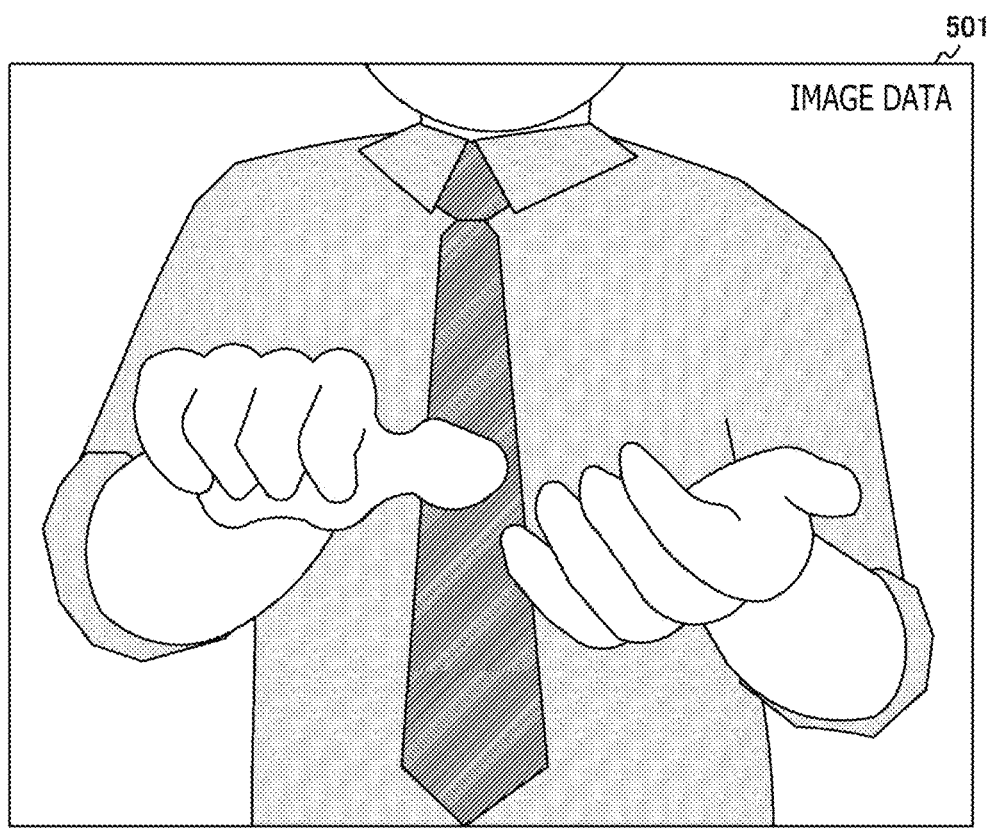
FIG. 10 depicts one example of image data in the first embodiment of the present technology.

FIG. 10 depicts one example of image data 501 in the first embodiment of the present technology. Image data such as the image data 501 is captured in synchronization with the vertical synchronization signal VSYNC1.

Figure 11:
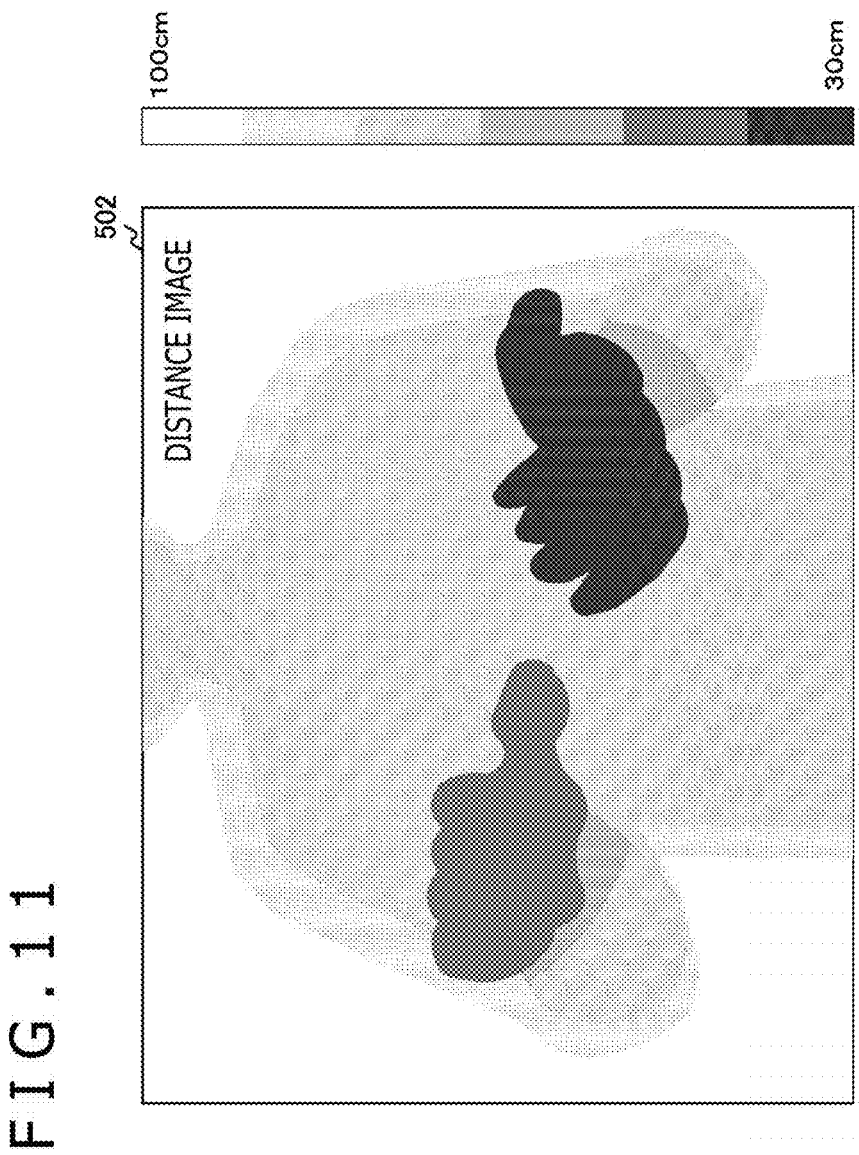
FIG. 11 depicts one example of a distance image in the first embodiment of the present technology.

FIG. 11 depicts one example of a distance image 502 in the first embodiment of the present technology. In FIG. 11, the depth of color expresses a distance. The distance image 502 is generated in non-synchronization with the image data, for example. Note that a configuration of generating the distance image 502 in synchronization with the image data may be adopted.

Figure 12:
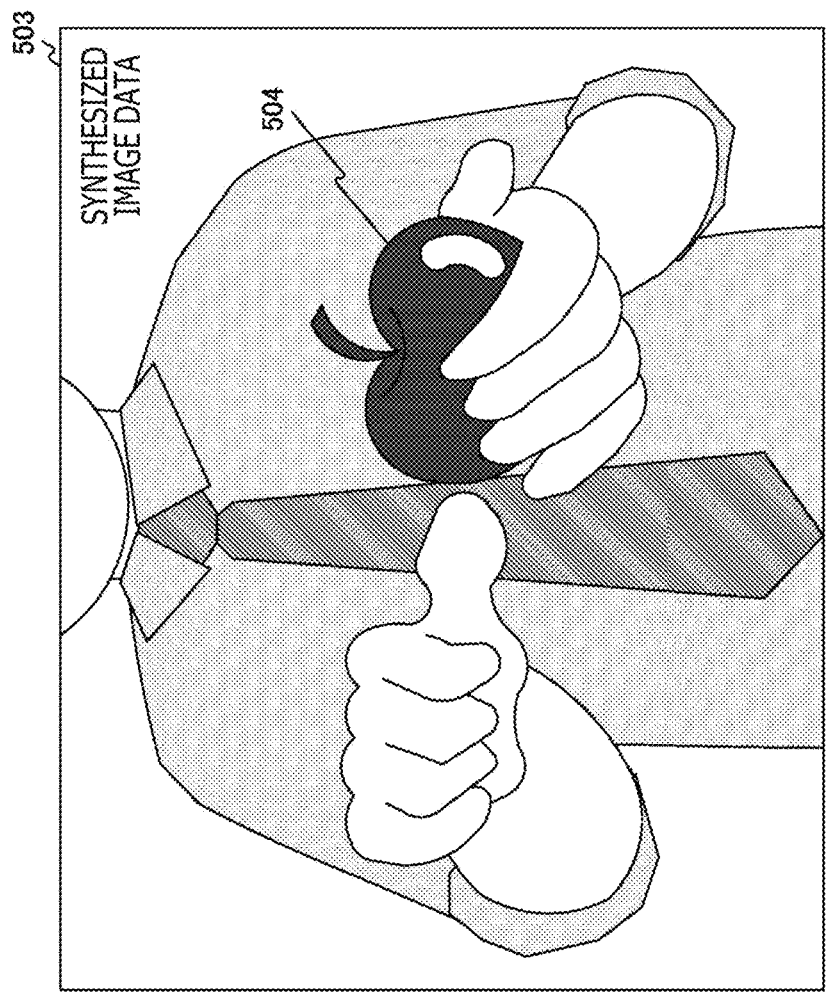
FIG. 12 is one example of synthesized image data in the first embodiment of the present technology.

FIG. 12 depicts one example of synthesized image data 503 in the first embodiment of the present technology. The image synthesis section 112 synthesizes data 504 indicating an unreal apple, etc., with the image data 501 depicted in FIG. 10, on the basis of the distance image 502 depicted in FIG. 11. As a result, the synthesized image data 503 is generated. Such a synthesis process is used for implementing an AR (Augmented Reality) technology, for example.

[Operation Example of Electronic Apparatus]

Figure 13:
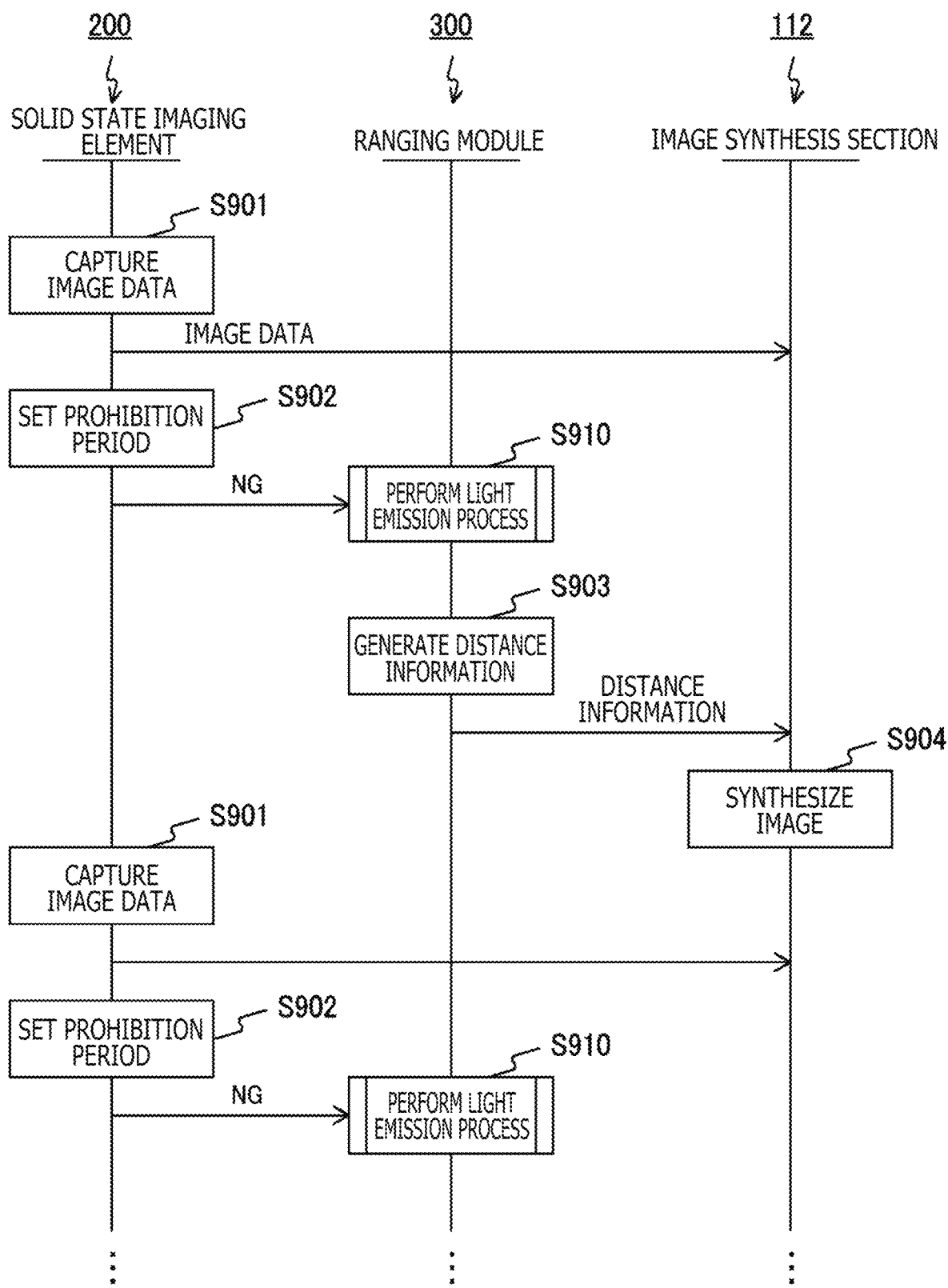
FIG. 13 is a sequence diagram depicting one example of operation of the electronic apparatus according to the first embodiment of the present technology.

FIG. 13 is a sequence diagram depicting one example of operation of the electronic apparatus 100 according to the first embodiment of the present technology. The operation is started upon execution of an application for image synthesis, for example. The solid state imaging element 200 in the electronic apparatus 100 captures image data in synchronization with the vertical synchronization signal VSYNC1 (step S901), and sets the prohibition period in the cycle of the VSYNC1 (step S902). The image data is supplied to the image synthesis section 112, and the prohibition signal NG indicating the prohibition period is supplied to the ranging module 300. Further, the ranging module 300 executes a light emission process for starting or stopping light emission (step S910), and generates distance information (step S903). The distance information is supplied to the image synthesis section 112. Moreover, the image synthesis section 112 executes a synthesis process on the image data on the basis of the distance information (step S904).

The aforementioned processes are repeatedly executed. Here, capturing of image data is carried out in non-synchronization with the light emission process and generation of the distance information, for example. Note that a configuration of carrying out capturing of image data in synchronization with the light emission process and generation of the distance information, may be adopted.

Figure 14:
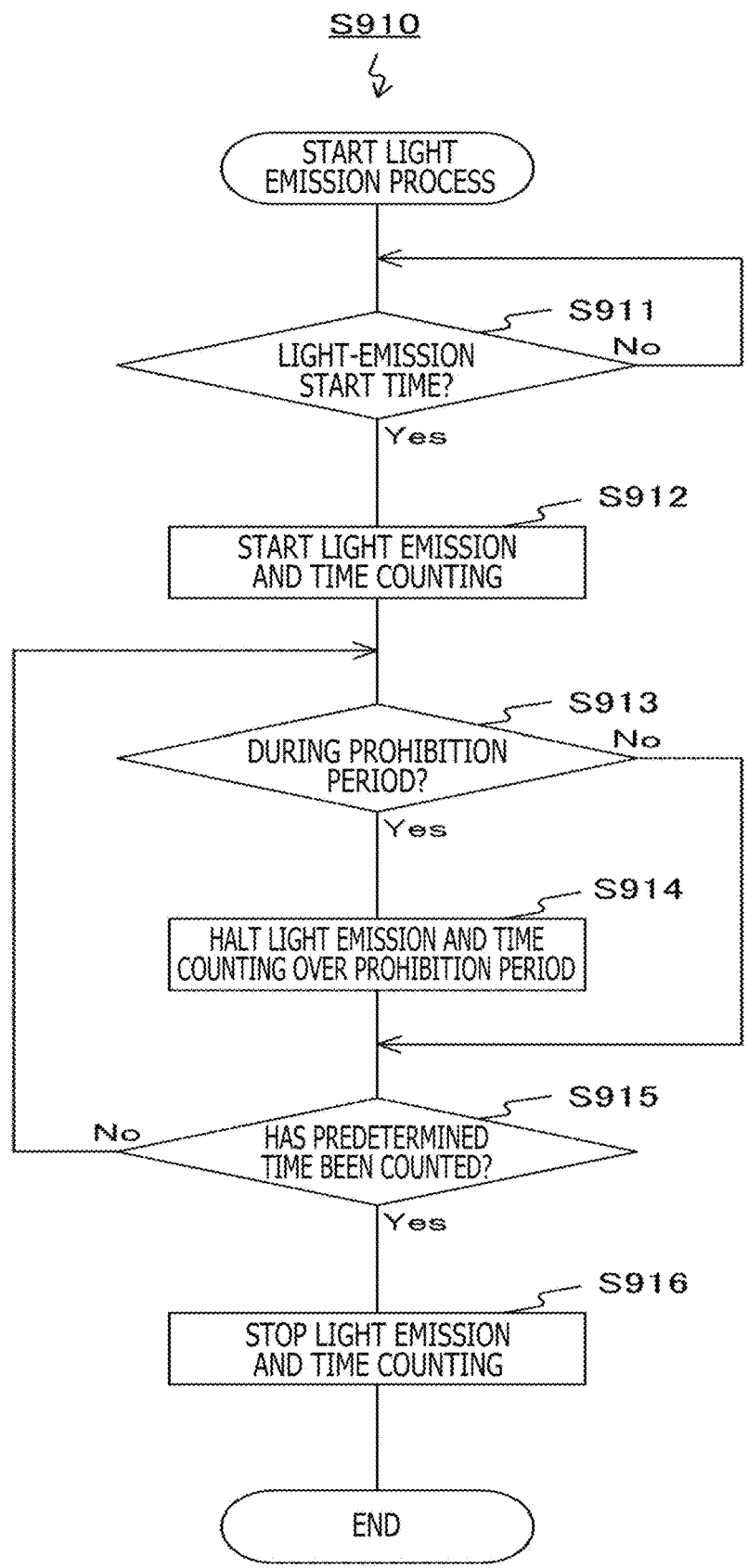
FIG. 14 is a flowchart depicting one example of a light emission process according to the first embodiment of the present technology.

FIG. 14 is a flowchart depicting one example of the light emission process according to the first embodiment of the present technology. The ranging module 300 determines whether or not the current time is the light emission start time (step S911). In a case where the current time is not the light emission start time (step S911: No), the ranging module 300 repeats step S911.

In contrast, in a case where the current time is the light emission start time (step S911: Yes), the ranging module 300 starts emission of pulse light and clocking of the light emission time (step S912). Subsequently, the ranging module 300 determines whether or not the current time is within the prohibition period (step S913). In a case where the current time is within the prohibition time (step S913: Yes), the ranging module 300 halts the light emission of pulse light and clocking of the light emission time over the prohibition time (step S914).

In a case where the current time is not within the prohibition time (step S913: No) or after step S914, the ranging module 300 determines whether or not a preset predetermined time has been clocked (step S915). In a case where the predetermined time has not been clocked (step S915: No), the ranging module 300 repeatedly executes step S913 and the subsequent processes.

In a case where the predetermined time has been clocked (step S915: Yes), the ranging module 300 stops the light emission of pulse light and clocking of the light emission time (step S916), and ends the light emission process.

According to the first embodiment of the present technology, the ranging module 300 executes start and stoppage of the light emission in a period other than the prohibition period, and halts the light emission during the prohibition period, as described above. Therefore, fluctuations of voltage or current can be suppressed during the prohibition period. As a result, noise in the solid state imaging element 200 due to a fluctuation of voltage or the like can be suppressed during the prohibition period.

[Modification]

Although the electronic apparatus 100 forcibly stops emission of pulse light over the prohibition period in the aforementioned first embodiment, the longer prohibition period may lengthen a time taken to start reading of distance information since the light emission start time. For example, in a case where "30"-millisecond light emission is required to generate the distance information for one frame, when a "1"-millisecond prohibition period is inserted before the elapse of "30" milliseconds since the light emission start time, reading of the distance information is started after the elapse of "31" milliseconds since the light emission start time. Thus, when the time taken until reading of distance information is started is long, the frame rate of the distance image may be deteriorated. The electronic apparatus 100 according to the modification of the first embodiment differs from that of the first embodiment in that deterioration of the frame rate of a distance image is suppressed.

FIG. 15 is a block diagram illustrating one configuration example of the light emission control section 310 according to the modification of the first embodiment of the present technology. The light emission control section 310 differs from that of the first embodiment in that a light-emission continuation control section 340 is further included.

Further, no prohibition signal NG is inputted to each of the pulse period adjustment section 320 and the light-emission enable signal generation section 330 in the modification of the first embodiment. Accordingly, the pulse period adjustment section 320 does not halt clocking of the light emission time during the prohibition period, and also, the light-emission enable signal generation section 330 does not stop generation of the light-emission enable signal during the prohibition period. The light-emission enable signal generation section 330 supplies, as ENin, the generated light-emission enable signal to the light-emission continuation control section 340.

The light-emission continuation control section 340 continues the light emission over the prohibition period in a case where the start time of the prohibition period comes during clocking of the light emission time. The light-emission continuation control section 340 generates a light-emission enable signal ENout for continuing the light emission, and supplies the light-emission enable signal ENout to the light emission section 350.

FIG. 16 is a diagram depicting one example of operation of the light-emission continuation control section 340 according to the modification of the first embodiment of the present technology. In a case where the prohibition signal NG is enabled during generation of the light-emission enable signal ENin (that is, during clocking), the light-emission continuation control section 340 sets an internal flag to be on, and directly outputs the light-emission enable signal ENin as ENout.

Also, in a case where the light-emission enable signal ENin is stopped while the prohibition signal NG is enabled, when the internal flag is on, the light-emission continuation control section 340 generates the light-emission enable signal ENout to continue the light emission of pulse light. On the other hand, when the internal flag is off, the light-emission continuation control section 340 stops the light-emission enable signal ENout.

Also, in a case where the light-emission enable signal ENin is generated while the prohibition signal NG is disabled, the light-emission continuation control section 340 turns off the internal flag, and directly outputs the light-emission enable signal ENin as ENout. On the other hand, in a case where the light-emission enable signal ENin is stopped while the prohibition signal NG is disabled, the light-emission continuation control section 340 stops the light-emission enable signal ENout.

Figure 17:
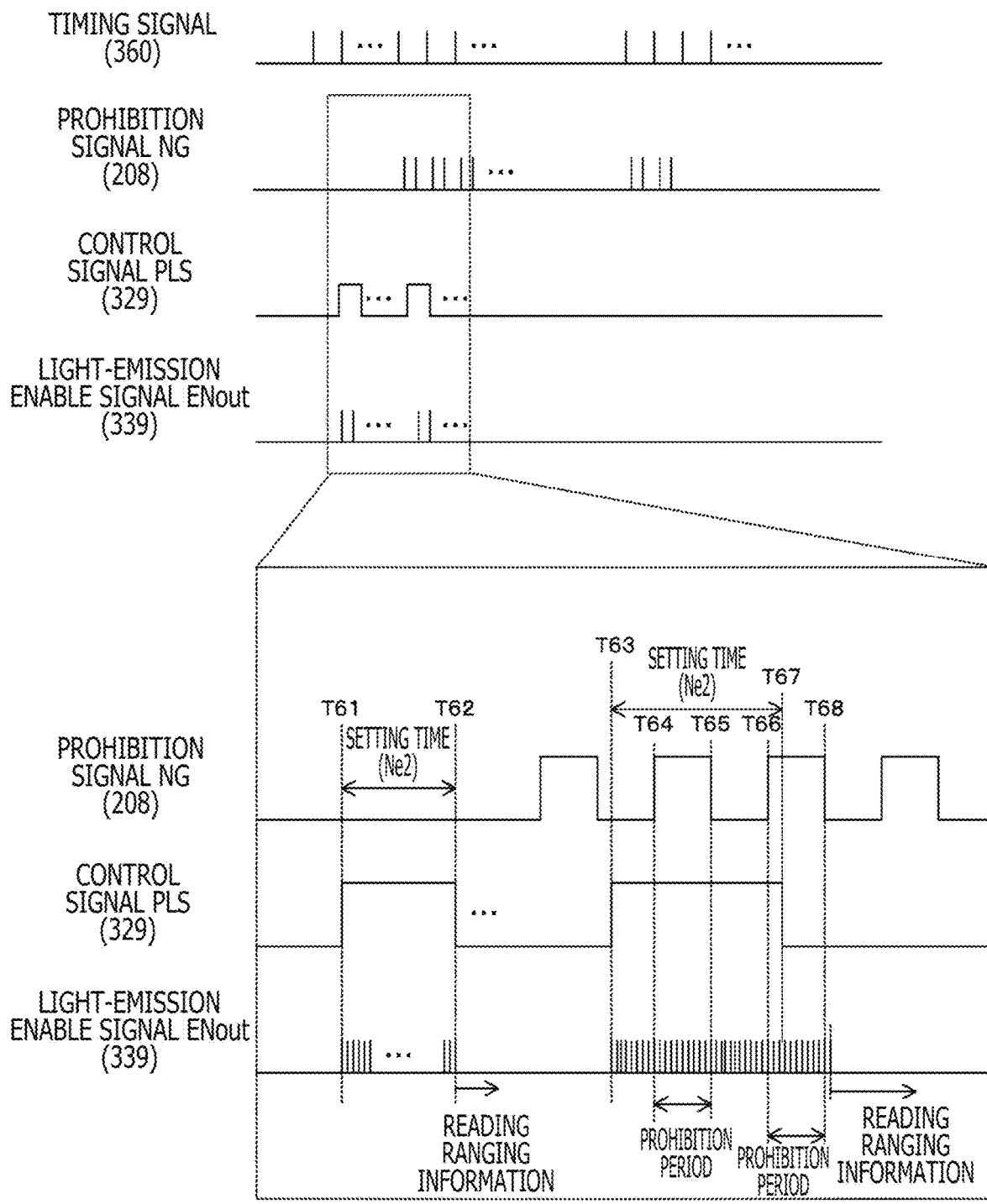
FIG. 17 is a timing chart depicting one example of operation of a ranging module according to the modification of the first embodiment of the present technology.

FIG. 17 is a timing chart depicting one example of operation of the ranging module 300 according to the modification of the first embodiment of the present technology.

At timing T61, the pulse period adjustment section 320 starts clocking of the light emission time, and also enables the control signal PLS. Then, at timing T62 when the counter value reaches Ne2, the pulse period adjustment section 320 disables the control signal PLS. Note that, regarding the prohibition signal NG and the control signal PLS in FIG. 17, the enabled state is expressed by a high level while the disabled state is expressed by a low level. Note that the low level may express the enabled state of each of these signals, conversely.

The light-emission continuation control section 340 outputs the light-emission enable signal ENout to emit pulse light over the period from timing T61 to T62 during which the control signal PLS is enabled. Then, ranging information for one frame is read after timing T62.

Further, at timing T63, the pulse period adjustment section 320 starts clocking of the light emission time, and also enables the control signal PLS. The prohibition signal NG is set to the enabled state over the period from timing T64 to T65 and over the period from timing T66 to T68.

The pulse period adjustment section 320 ends the clocking at timing T67 between timing T66 and T68, and disables the control signal PLS. However, since the prohibition time is being continued at this time point, the light-emission continuation control section 340 outputs the light-emission enable signal ENout to forcibly emit pules light over the period until the ending timing T68 of the prohibition period. Then, after timing T68, ranging information for one frame is read.

Since clocking is ended at timing T67, the period from timing T67 to T68 is a redundant light emission time unnecessary for generation of distance information for one frame. However, even when the prohibition period is inserted during emission of pulse light, the ranging module 300 does not need to halt the light emission. Thus, compared to the first embodiment in which the light emission is halted, a time taken until reading of distance information can be shortened.

Figure 18:
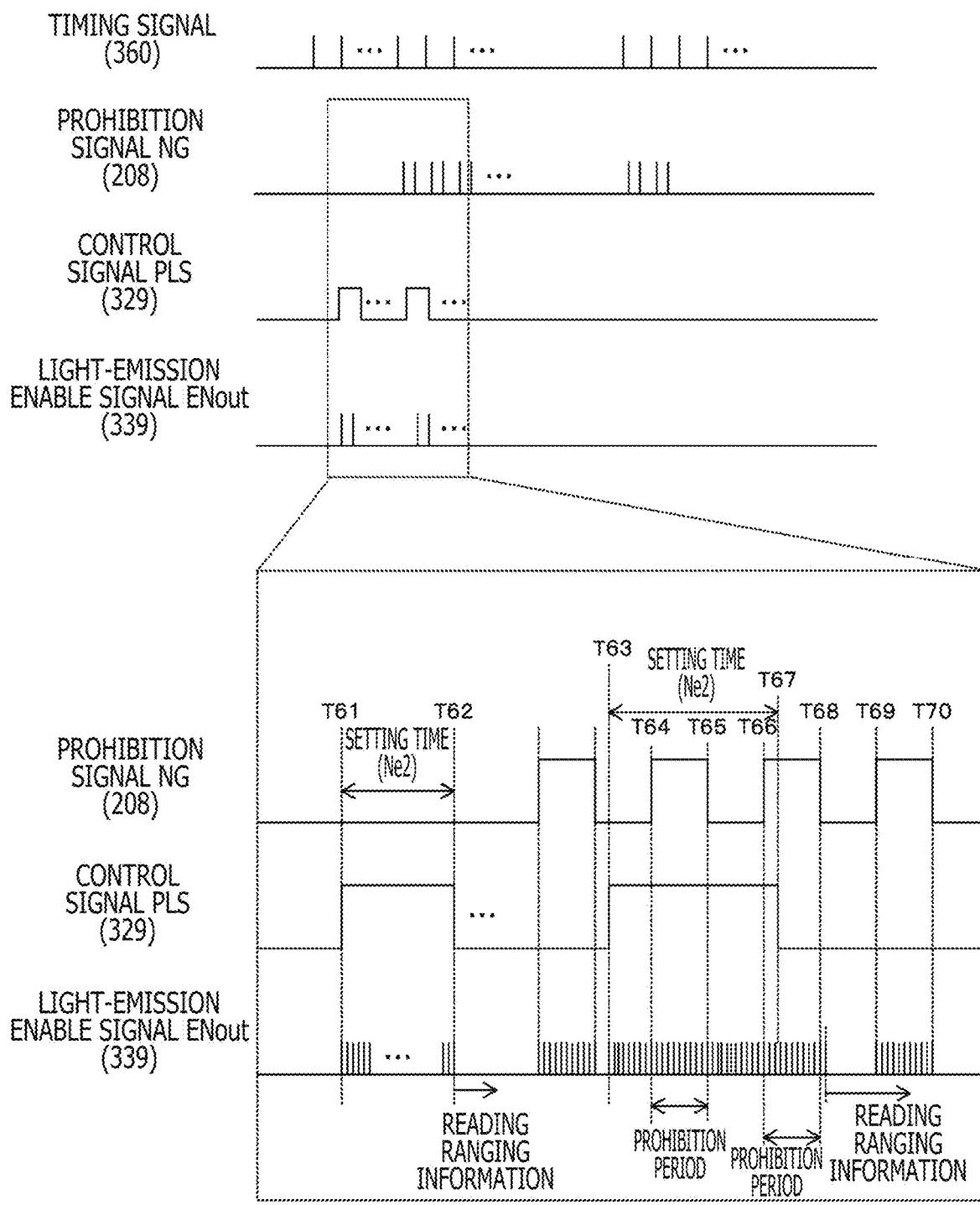
FIG. 18 is a timing chart depicting one example of another operation of the ranging module according to the modification of the first embodiment of the present technology.

Note that the light emission control section 310 does not emit pulse light in a case where the prohibition signal NG is enabled in a period during which clocking is not being performed (the control signal PLS is enabled), but this configuration is not limited. For example, a configuration in which the light emission is constantly carried out during the prohibition period, irrespective of whether or not clocking is being performed, as depicted in FIG. 18, may be adopted. That is, in this configuration, the light emission control section 310 emits pulse light during clocking or during the prohibition period. In FIG. 18, in the period from timing T69 to T70 and the like, the control signal PLS is disabled but the prohibition signal NG is enabled. Thus, the light emission control section 310 forcibly causes the light emission over the prohibition period.

In the modification of the first embodiment of the present technology, the ranging module 300 continues emission of pulse light over the prohibition period, as described above. Therefore, compared to the case where pulse light is halted during the prohibition period, the time taken until reading of distance information can be shortened. As a result, deterioration of the frame rate of the distance image can be suppressed.

2. Second Embodiment

In the aforementioned first embodiment, the solid state imaging element 200 generates the prohibition signal NG. However, in such a configuration, a circuit for processing the prohibition signal NG needs to be provided in each of the solid state imaging element 200 and the ranging module 300. When the ranging module 300 is configured to internally generate the prohibition signal NG, it is sufficient to provide a circuit concerning the prohibition signal NG only to the ranging module 300 so that a general configuration can be used for the solid state imaging element 200. Accordingly, a burden on a designer thereof can be reduced. The electronic apparatus 100 according to the second embodiment differs from that of the first embodiment in that the ranging module 300 internally generates the prohibition signal NG.

Figure 19:
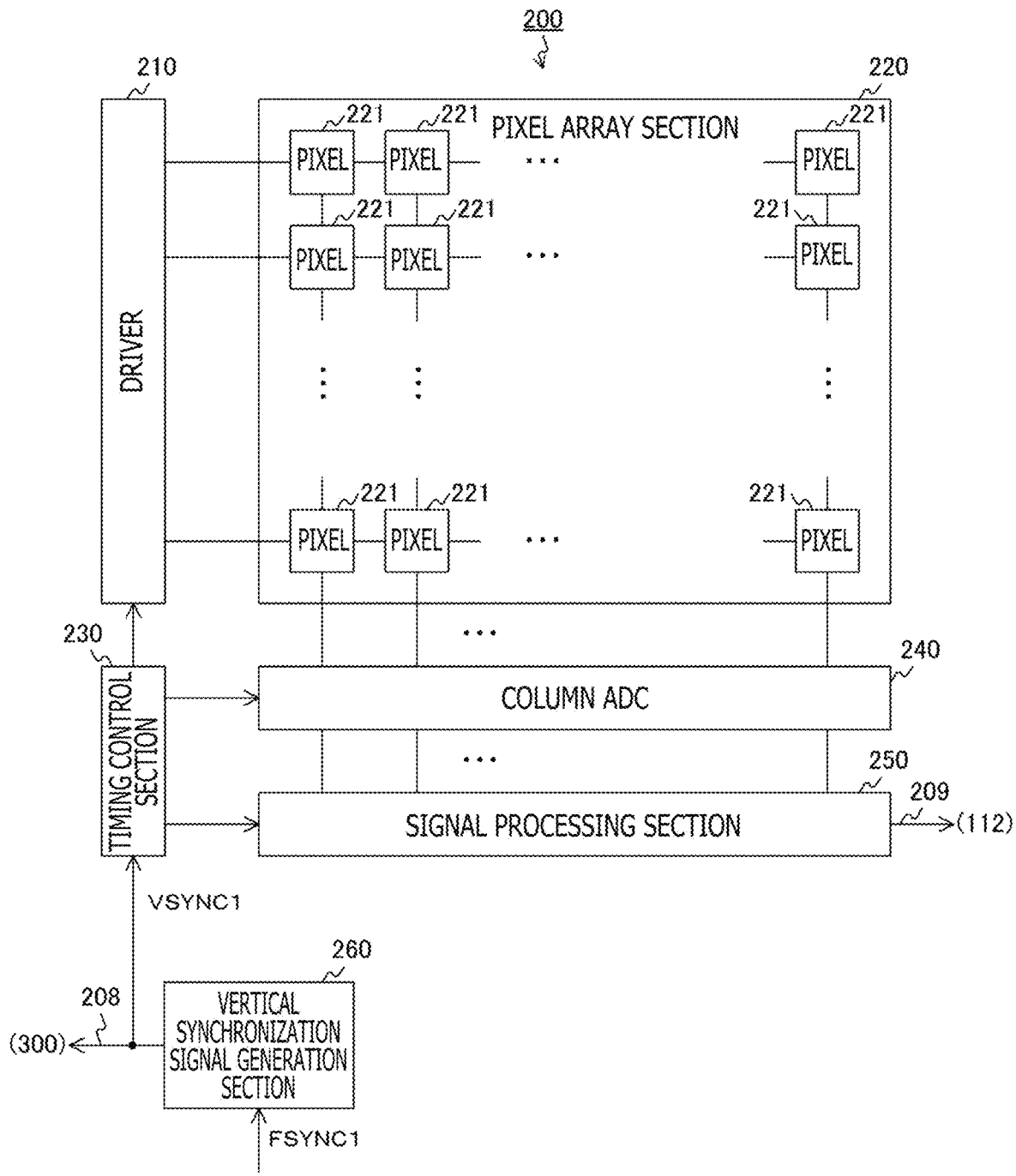
FIG. 19 is a block diagram illustrating one example configuration of a solid state imaging element according to a second embodiment of the present technology.

FIG. 19 is a block diagram illustrating one configuration example of the solid state imaging element 200 according to the second embodiment of the present technology. The solid state imaging element 200 according to the second embodiment differs from that of the first embodiment in that the prohibition period setting section 270 is not included. The vertical synchronization signal generation section 260 according to the second embodiment supplies the vertical synchronization signals VSYNC1 to the timing control section 230 and the ranging module 300.

Figure 20:
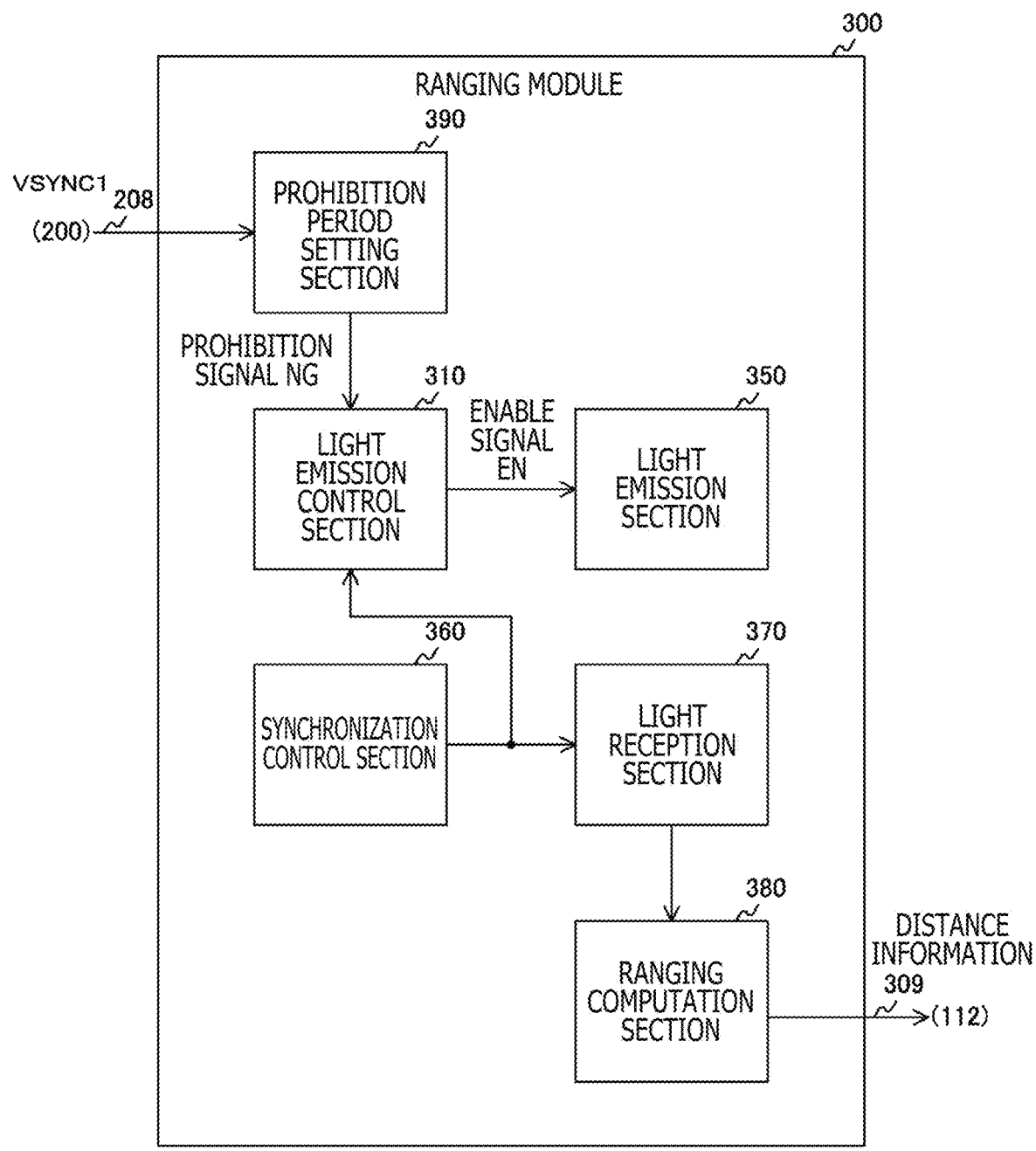
FIG. 20 is a block diagram illustrating one configuration example of a ranging module according to the second embodiment of the present technology.

FIG. 20 is a block diagram illustrating one configuration example of the ranging module 300 according to the second embodiment of the present technology. The ranging module 300 according to the second embodiment differs from the that of the first embodiment in that a prohibition period setting section 390 is further included.

The configuration of the prohibition period setting section 390 is similar to that of the prohibition period setting section 270 according to the first embodiment.

In the second embodiment of the present technology, the ranging module 300 generates the prohibition signal NG, as described above. Thus, it is sufficient that designing related to the prohibition signal NG is performed only for the ranging module 300, whereby designing of the electronic apparatus 100 becomes easy.

3. Application Example to Moving Body

A technology according to the present disclosure (present technology) is applicable to various products. For example, the technology according to the present disclosure may be implemented as a device that is installed in any kind of a moving body such as an automobile, an electric car, a hybrid electric car, a motorcycle, abicycle, a personal mobility, an airplane, a drone, a ship, or a robot.

Figure 21:
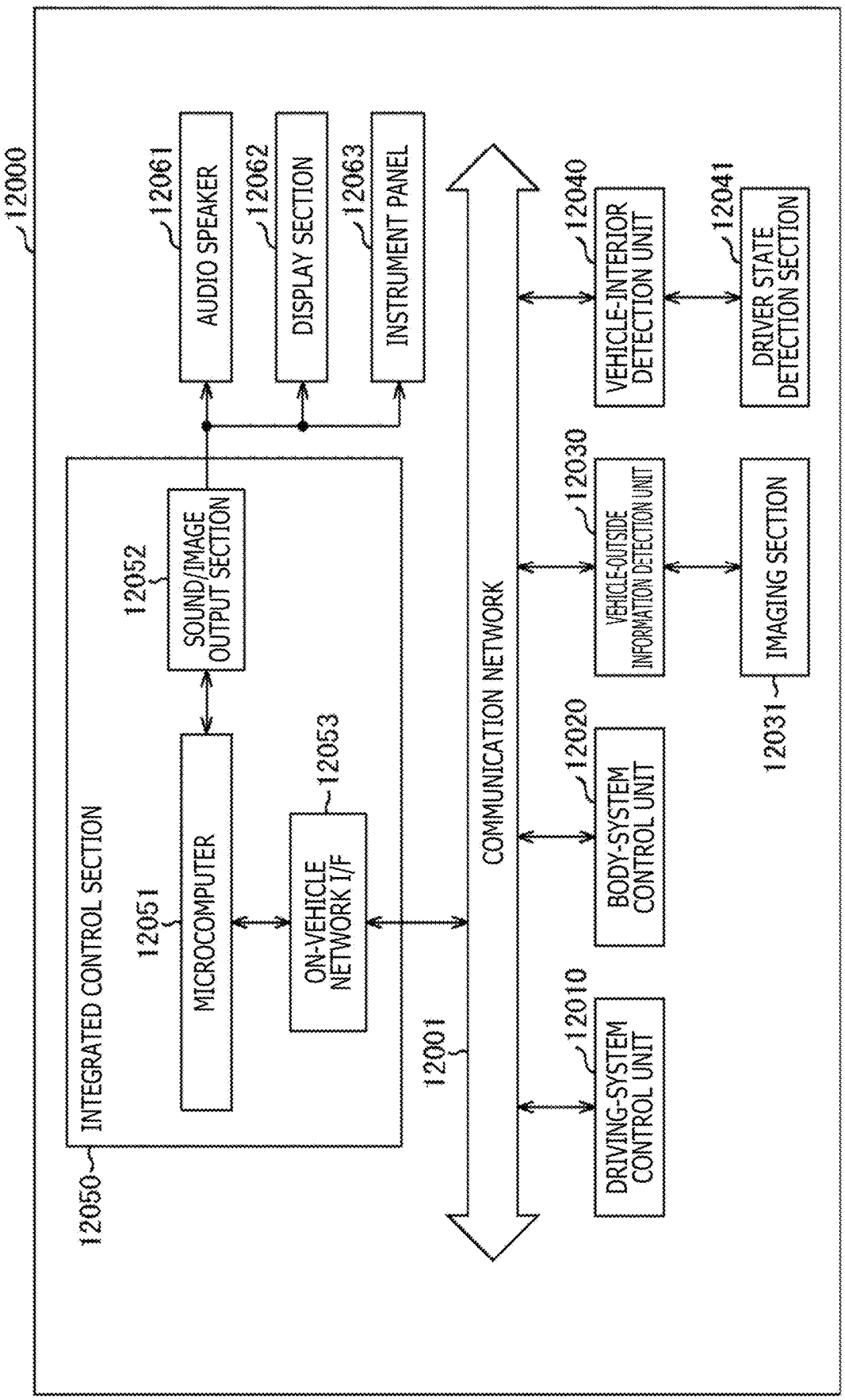
FIG. 21 is a block diagram illustrating a schematic configuration example of a vehicle control system.

FIG. 21 is a block diagram illustrating a schematic configuration example of a vehicle control system which is one example of a moving body control system to which the technology according to the present disclosure is applicable.

A vehicle control system 12000 includes a plurality of electronic control units connected via a communication network 12001. In the example illustrated in FIG. 21, the vehicle control system 12000 includes a drive-system control unit 12010, a body-system control unit 12020, a vehicle-outside information detection unit 12030, a vehicle-interior information detection unit 12040, and an integrated control unit 12050. In addition, a microcomputer 12051, a sound/image output section 12052, and an on-vehicle network I/F (interface) 12053 are illustrated as the function components of the integrated control unit 12050.

The drive-system control unit 12010 controls operation of a device related to the driving system of the vehicle in accordance with various programs. For example, the drive-system control unit 12010 functions as a driving force generation device, such as an internal combustion engine or a driving motor, for generating a vehicle driving force, as a driving force transmission mechanism for transmitting the driving force to wheels, as a steering mechanism for adjusting the steering angle of the vehicle, and as a control device, such as a braking device, for generating a braking force for the vehicle.

The body-system control unit 12020 controls operation of the various devices mounted on the vehicle body, in accordance with various programs. For example, the body-system control unit 12020 functions as a control device for a keyless entry system, a smart key system, a power window device, or for various lamps including a head lamp, a back lamp, a brake lamp, a blinker, and a fog lamp. In this case, radio waves emitted from a mobile machine serving as a substitute for a key and signals from various switches can be inputted to the body-system control unit 12020. Upon receiving input of the radio waves and the signals, the body-system control unit 12020 controls the vehicle door lock device, the power window device, the lamps, and the like.

The vehicle-outside information detection unit 12030 detects information about the outside of the vehicle having the vehicle control system 12000 installed therein. For example, an imaging section 12031 is connected to the vehicle-outside information detection unit 12030. The vehicle-outside information detection unit 12030 causes the imaging section 12031 to capture an image of the outside of the vehicle, and further, receives the captured image. The vehicle-outside information detection unit 12030 may execute a process for detecting an object such as a person, a vehicle, an obstacle, a sign, or a character on a road surface, or may execute a process for detecting the distance therefrom, on the basis of the received image.

The imaging section 12031 is an optical sensor that receives light and outputs an electric signal corresponding to the reception quantity of the light. The imaging section 12031 can output the electric signal as an image, or can output the electric signal as ranging information. Moreover, light to be received by the imaging section 12031 may be visible light, or may be non-visible light such as infrared rays.

The vehicle-interior information detection unit 12040 detects information about the interior of the vehicle. For example, a driver condition detection section 12041 that detects the condition of a driver is connected to the vehicle-interior information detection unit 12040. For example, the driver condition detection section 12041 includes a camera for capturing an image of the driver, and the vehicle-interior information detection unit 12040 may calculate the fatigue degree or concentration degree of the driver or may determine whether or not the driver is dozing off, on the basis of the detection information inputted from the driver condition detection section 12041.

The microcomputer 12051 can computes a control target value for the driving force generation device, the steering mechanism, or the braking device, on the basis of the information about the outside or interior of the vehicle acquired by the vehicle-outside information detection unit 12030 or the vehicle-interior information detection unit 12040, and can output a control command to the drive-system control unit 12010. For example, the microcomputer 12051 can perform coordination control for the purpose of implementing the function of an ADAS (advanced driver assistance system) including vehicle collision avoidance or impact absorbing, follow-up traveling based on an inter-vehicle distance, traveling with the vehicle speed being maintained, a vehicle collision alarm, or an alarm about deviation of the vehicle from a lane.

Further, the microcomputer 12051 can perform the coordination control for the purpose of achieving automatic driving of autonomously traveling, without depending on an operation performed by the driver, by controlling the driving force generation device, the steering mechanism, and the braking device, etc., on the basis of information about the surrounding area of the vehicle acquired by the vehicle-outside information detection unit 12030 or the vehicle-interior information detection unit 12040.

Further, the microcomputer 12051 can output a control command to the body-system control unit 12020 on the basis of information about the outside of the vehicle acquired by the vehicle-outside information detection unit 12030. For example, by controlling a head lamp according to the position of a preceding vehicle or an oncoming vehicle detected by the vehicle-outside information detection unit 12030, the microcomputer 12051 can perform coordination control of, for example, switching a high beam to a low beam in order to prevent glare.

The sound/image output section 12052 transmits an output signal of at least one of a sound or an image to an output device that is capable of visually or audibly reporting information to an occupant in the vehicle or to the outside of the vehicle. In the example in FIG. 21, an audio speaker 12061, a display section 12062, and an instrument panel 12063 are depicted as examples of the output device. For example, the display section 12062 may include at least one of an on-board display or a head-up display.

Figure 22:
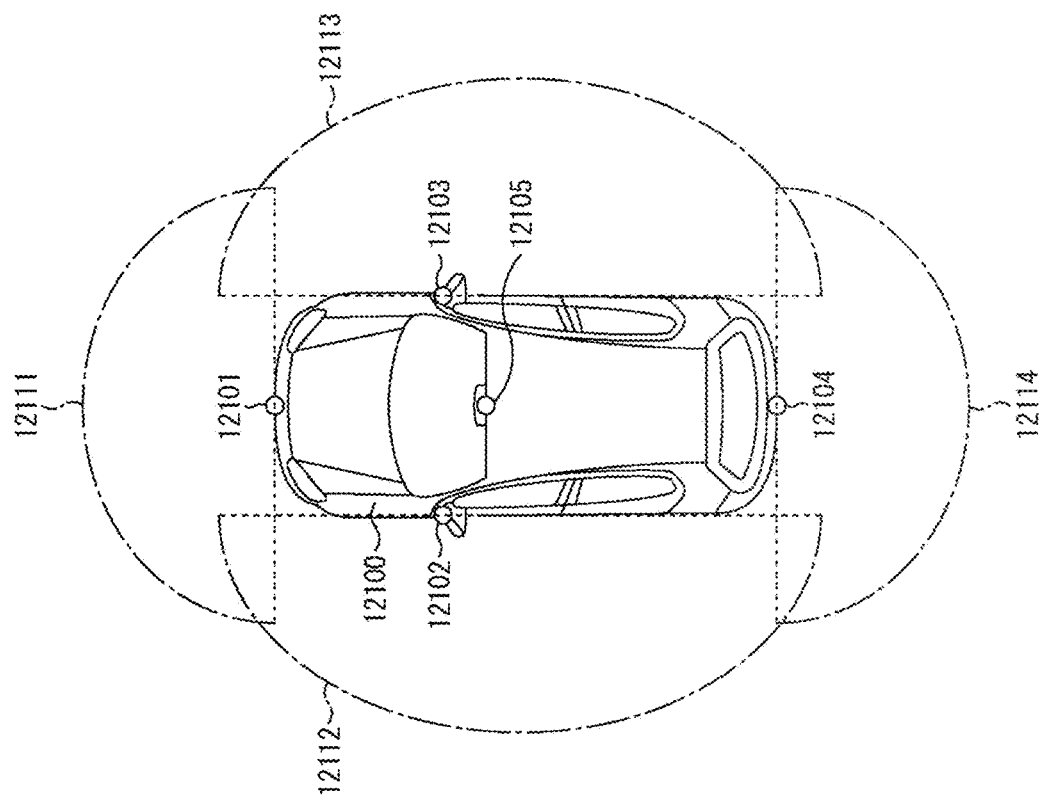
FIG. 22 is an explanatory diagram illustrating one example of the installation positions of imaging sections.

FIG. 22 is a diagram illustrating an example of the installation positions of the imaging sections 12031. In FIG. 21, imaging sections 12101, 12102, 12103, 12104 and 12105 are included as the imaging sections 12031.

The imaging sections 12101, 12102, 12103, 12104 and 12105 are provided at positions such as a front nose, sideview mirrors, a rear bumper, a back door, and the upper portion of a windshield in the interior of the vehicle cabin, etc., of a vehicle 12100, for example. The imaging section 12101 provided to the front nose and the imaging section 12105 provided to the upper portion of the windshield in the interior of the vehicle cabin mainly acquire images of the front side of the vehicle 12100. The imaging sections 12102 and 12103 provided to the sideview mirrors mainly acquire images of the lateral sides of the vehicle 12100. The imaging section 12104 provided to the rear bumper or the back door mainly acquires an image of the rear side of the vehicle 12100. The imaging section 12105 provided to the upper portion of the window shield in the interior of the vehicle cabin is mainly used for detection of a preceding vehicle, or detection of a walking person, an obstacle, a traffic signal, a traffic sign, and a lane, etc.

Note that FIG. 22 illustrates one example of the photographing ranges of the imaging sections 12101 to 12104. A photographing range 12111 represents the photographing range of the imaging section 12101 provided to the front nose. Photographing ranges 12112 and 12113 represent the photographing ranges of the imaging sections 12102 and 12103 provided to the sideview mirrors, respectively. A photographing range 12114 represents the photographing range of the imaging section 12104 provided to the rear bumper or the back door. For example, as a result of superimposition of image data captured by the imaging sections 12101 to 12104, an overhead view in which the vehicle 12100 is viewed from above is obtained.

At least one of the imaging sections 12101 to 12104 may have a function of acquiring distance information. For example, at least one of the imaging sections 12101 to 12104 may be a stereo camera including a plurality of imaging elements, or may be an imaging element having pixels for phase difference detection.

For example, by obtaining the distance to each of stereoscopic objects within the photographing ranges 12111 to 12114 and obtaining the time-based change (relative speed with respect to the vehicle 12100) of the distance on the basis of the distance information obtained from the imaging sections 12101 to 12104, the microcomputer 12051 can extract, as a preceding vehicle, a stereoscopic object that is located, on the advancing path of the vehicle 12100, closest thereto and that is travelling at a predetermined speed (e.g., 0 km/h or higher) in substantially the same direction as the direction of the vehicle 12100. Further, the microcomputer 12051 can preliminarily set an inter-vehicle distance to be ensured on the forward side to the preceding vehicle, thereby perform automatic brake control (including follow-up stop control), automatic acceleration control (including follow-up start control), or the like. In this way, the coordination control for the purpose of automatic driving of autonomously driving without depending on an operation performed by the driver, can be performed.

For example, the microcomputer 12051 can classify stereoscopic object data about stereoscopic objects into a motorcycle, an ordinary vehicle, a large vehicle, a walking person, a utility pole, or other stereoscopic objects, on the basis of the distance information obtained from the imaging sections 12101 to 12104, and extract the data for automatic obstacle avoidance. For example, the microcomputer 12051 discriminates between an object that is visually recognizable to the driver of the vehicle 12100 and an object that is not visually recognizable, among obstacles in the surrounding area of the vehicle 12100. Then, the microcomputer 12051 determines a collision risk indicating the risk degree of a collision with each of the obstacles, and, in a state where there is a collision possibility because the collision risk is equal to or higher than a set value, outputs an alarm to the driver via the audio speaker 12061 or the display section 12062 or performs forcible speed reduction or avoidance steering via the drive-system control unit 12010 so that driving assist for avoiding a collision can be performed.

An infrared camera that detects infrared rays may be used for at least one of the imaging sections 12101 to 12104. For example, the microcomputer 12051 can recognize a walking person by determining whether or not the walking person is present in images captured by the imaging sections 12101 to 12104. Such recognition of a walking person is carried out through a step of extracting feature points in images captured by the imaging sections 12101 to 12104 as infrared cameras, for example, and a step of performing pattern matching processing on a series of the feature points indicating the outline of an object, and determining whether or not the object is a walking person. When the microcomputer 12051 determines that a walking person is present in the images captured by the imaging sections 12101 to 12104 and recognizes the walking person, the sound/image output section 12052 controls the display section 12062 to display a rectangular outline for emphasis such that the rectangular outline is superimposed on the recognized walking person. Alternatively, the sound/image output section 12052 may control the display section 12062 to display, at a desired position, an icon or the like indicating the walking person.

One example of the vehicle control system to which the technology according to the present disclosure is applicable has been explained above. The technology according to the present disclosure is applicable to the imaging section 12031 and the vehicle-outside information detection unit 12030 in the aforementioned configuration, for example. Specifically, the solid state imaging element 200 in FIG. 1 is applicable to the imaging section 12031, and the ranging module 300 is applicable to the vehicle-outside information detection unit 12030. As a result of application of the technology according to the present disclosure to the imaging section 12031 and the vehicle-outside information detection unit 12030, noise can be reduced and the image quality of the image data can be enhanced.

Note that the aforementioned embodiments each exemplify one example for embodying the present technology, and the features of the embodiments have the correspondence relationship with the invention-specifying features of the claims. Similarly, the invention-specifying features of the claims have the correspondence relationship with components, of the embodiments, referred to as the same names. However, the present technology is not limited to the embodiments, and can be embodied by various modifications of the embodiments within the scope of the gist of the present technology.

Moreover, the process steps explained in the aforementioned embodiments may be regarded as a method including a series of these steps, or may be regarded as a program for causing a computer to execute the series of these steps or a recording medium having the program stored therein. For example, a CD (compact disc), an MD (minidisc), a DVD (digital versatile disc), a memory card, a Blu-ray (registered trademark) disc, or the like can be used as the recording medium.

Note that the effects described in the present description are just examples, and thus, are not limited. In addition, another effect may be provided.

Note that the present technology can also take the configurations as follows.

(1) An electronic apparatus including:
an imaging section that captures image data;
a light emission section that emits irradiation light;
a prohibition period setting section that sets, as a prohibition period, a period during which noise is generated in the imaging section due to start or stoppage of the light emission of irradiation light; and
a light emission control section that controls the light emission section so as to prohibit start and stoppage of the light emission during the prohibition period.

(2) The electronic apparatus according to (1), in which
the light emission control section performs control such that a time during which the light emission is carried out by the light emission section is clocked, and the light emission is stopped when a predetermined time has been clocked.

(3) The electronic apparatus according to (2), in which
in a case where a start time of the prohibition period comes during clocking, the light emission control section halts the clocking and causes the light emission section to halt the light emission, over the prohibition period.

(4) The electronic apparatus according to claim (2), in which
in a case where a start time of the prohibition period comes during clocking, the light emission section causes the light emission section to continue the light emission over the prohibition period, and causes the light emission section to stop the light emission when an end time of the prohibition period comes.

(5) The electronic apparatus according to (2), in which
the light emission control section causes the light emission section to carry out the light emission during clocking or over the prohibition period.

(6) The electronic apparatus according to any one of (1) to (5), in which
the imaging section and the light emission section are provided on the same substrate.

(7) The electronic apparatus according to any one of (1) to (6), in which
the imaging section and the prohibition period setting section are provided in a solid state imaging element.

(8) The electronic apparatus according to any one of (1) to (6), in which
the imaging section is provided in a solid state imaging element, and
the prohibition period setting section is provided outside the solid state imaging element.

(9) The electronic apparatus according to any one of (1) to (8), in which
the image data includes pixel data,
the imaging section generates the pixel data by converting an analog signal to a digital signal during a predetermined sampling period, and
the prohibition period includes the sampling period.

(10) The electronic apparatus according to any one of (1) to (9), further including:
a light reception section that receives reflection light of the irradiation light; and
a ranging computation section that computes a distance on the basis of a phase difference between the irradiation light and the reflection light.

(11) The electronic apparatus according to (10), further including:
an image synthesis section that synthesizes predetermined data with the image data on the basis of the distance.

(12) An electronic apparatus control method including:
an imaging step of capturing image data;
a light emission step of emitting irradiation light;
a prohibition period setting step of setting, as a prohibition period, a period during which noise is generated in the imaging section due to start or stoppage of the light emission of irradiation light; and
a light emission control step of controlling the light emission section so as to prohibit start and stoppage of the light emission during the prohibition period.

REFERENCE SIGNS LIST

100 Electronic apparatus
110 Substrate
111 Power source circuit
112 Image synthesis section
120 Display section
200 Solid state imaging element
205 Imaging section
210 Driver
220 Pixel array section
221 Pixel
230 Timing control section
240 Column ADC
250 Signal processing section
260 Vertical synchronization signal generation section
270, 390 Prohibition period setting section
271, 322 Register
272, 323 Control circuit
273, 321, 324 Counter
300 Ranging module
310 Light emission control section
320 Pulse period adjustment section
330 Light-emission enable signal generation section
340 Light-emission continuation control section
350 Light emission section
360 Synchronization control section
370 Light reception section
380 Ranging computation section
12030 Vehicle-outside information detection unit
12031 Imaging section

The invention claimed is:

1. An electronic apparatus, comprising:
a solid state imaging element configured to capture image data;
first circuitry configured to set a prohibition period, wherein the prohibition period is a period in which noise is generated in the solid state imaging element based on one of start or stoppage of light emission of irradiation light; and
second circuitry configured to:
control the light emission of the irradiation light;
execute a clocking operation to clock a light emission time of the light emission; and
halt each of the clocking operation and the light emission based on start of the prohibition period in the light emission time.

2. The electronic apparatus according to claim 1, wherein the second circuitry is further configured to stop the light emission based on elapse of a specific time from start of the light emission time.

3. The electronic apparatus according to claim 2, wherein the second circuitry is further configured to stop the light emission based on an end time of the prohibition period.

4. The electronic apparatus according to claim 1, wherein the solid state imaging element and the second circuitry are on a same substrate.

5. The electronic apparatus according to claim 1, wherein the solid state imaging element includes the first circuitry.

6. The electronic apparatus according to claim 1, wherein the first circuitry is outside the solid state imaging element.

7. The electronic apparatus according to claim 1, wherein the image data includes pixel data,
the solid state imaging element is further configured to convert an analog signal to a digital signal in a sampling period to generate the pixel data, and
the prohibition period includes the sampling period.

8. The electronic apparatus according to claim 1, wherein the second circuitry is further configured to:
receive reflection light of the irradiation light; and
compute a distance to a subject based on a phase difference between the irradiation light and the reflection light.

9. The electronic apparatus according to claim 8, further comprising third circuitry configured to synthesize specific data with the image data based on the distance.

10. An electronic apparatus control method, comprising:
capturing image data by a solid state imaging element;
controlling light emission of irradiation light;
setting a prohibition period, wherein the prohibition period is a period in which noise is generated in the solid state imaging element based on one of start or stoppage of the light emission of the irradiation light;
executing a clocking operation to clock a light emission time of the light emission; and
halting each of the clocking operation and the light emission based on start of the prohibition period in the light emission time.

* * * * *